US012596912B2

(12) United States Patent
Allen et al.

(10) Patent No.: US 12,596,912 B2
(45) Date of Patent: Apr. 7, 2026

(54) SYSTEMS AND METHODS FOR USE IN OPERATIONS AND MAINTENANCE SYSTEMS FOR CONTROLLING THE OPERATION OF SECOND SYSTEM

(71) Applicant: Incucomm, Inc., Addison, TX (US)

(72) Inventors: Randal Allen, Orlando, FL (US); Steven D. Roemerman, Highland, TX (US); John P. Volpi, Garland, TX (US)

(73) Assignee: INCUCOMM, INC., Addison, TX (US)

( * ) Notice: Subject to any disclaimer, the term of this patent is extended or adjusted under 35 U.S.C. 154(b) by 51 days.

(21) Appl. No.: 18/449,532

(22) Filed: Aug. 14, 2023

(65) Prior Publication Data

US 2024/0111996 A1      Apr. 4, 2024

Related U.S. Application Data

(63) Continuation of application No. 16/675,000, filed on Nov. 5, 2019, now abandoned.

(Continued)

(51) Int. Cl.
G06N 3/045          (2023.01)
G06F 7/22           (2006.01)
(Continued)

(52) U.S. Cl.
CPC ............... G06N 3/045 (2023.01); G06F 7/22 (2013.01); G06F 11/3452 (2013.01);
(Continued)

(58) Field of Classification Search
CPC ........... G06N 3/045; G06N 3/08; G06N 7/01; G06N 20/00; G06N 3/048; G06N 3/042;
(Continued)

(56) References Cited

U.S. PATENT DOCUMENTS 6,574,613 B1 *   6/2003   Moreno-Barragan .......................
                                                 G01N 33/0034
                                                        706/2
8,301,406 B2 *  10/2012   Lee ..................... G06F 18/2137
                                                        702/77

(Continued)

FOREIGN PATENT DOCUMENTS

WO        WO-2019022737 A1 *  1/2019  .............. G06F 11/00

*Primary Examiner* — Mohamed Charioui

(74) *Attorney, Agent, or Firm* — Boisbrun Hofman, PLLC

(57) ABSTRACT

Disclosed are systems and methods for operations and maintenance (O&M) systems for controlling the operation of a second system, wherein the second system includes a plurality of objects (i.e., components and/or subsystems). The O&M system comprises means for evaluating at least one of the plurality of objects using a first model to produce a first prediction of a characteristic of the object; evaluating at least one of the plurality of objects using a second model to produce a second prediction of the characteristic of the object, the second model being dissimilar to the first model; generating a final prediction of the characteristic of the object as a function of dynamic weightings of the first prediction and the second prediction; and, executing an operational or maintenance decision with respect to the second system as a function of the final prediction of the characteristic of the at least one of the plurality of objects.

26 Claims, 10 Drawing Sheets

Related U.S. Application Data

(60) Provisional application No. 62/756,044, filed on Nov. 5, 2018.

(51) Int. Cl.

| | |
|---|---|
| *G06F 11/34* | (2006.01) |
| *G06F 17/11* | (2006.01) |
| *G06F 17/16* | (2006.01) |
| *G06F 17/18* | (2006.01) |
| *G06F 30/27* | (2020.01) |
| *G06N 3/08* | (2023.01) |
| *G06N 7/01* | (2023.01) |
| *G06N 20/00* | (2019.01) |
| *G06F 17/14* | (2006.01) |
| *G06F 111/10* | (2020.01) |

(52) U.S. Cl.
CPC .............. *G06F 17/11* (2013.01); *G06F 17/16* (2013.01); *G06F 17/18* (2013.01); *G06F 30/27* (2020.01); *G06N 3/08* (2013.01); *G06N 7/01* (2023.01); *G06N 20/00* (2019.01); *G06F 17/142* (2013.01); *G06F 2111/10* (2020.01)

(58) Field of Classification Search
CPC .......... G06N 3/105; G06N 5/01; G06N 3/084; G06F 7/22; G06F 11/3452; G06F 17/11; G06F 17/16; G06F 17/18; G06F 30/27; G06F 17/142; G06F 2111/10; G06F 2207/4824; G06F 7/023
See application file for complete search history.

(56) References Cited

U.S. PATENT DOCUMENTS

| | | | | |
|---|---|---|---|---|
| 2002/0002414 | A1* | 1/2002 | Hsiung .............. | G05B 23/0294 |
| | | | | 700/47 |
| 2016/0088502 | A1* | 3/2016 | Sanneck .............. | H04W 24/06 |
| | | | | 370/242 |
| 2017/0372205 | A1* | 12/2017 | Brown ............... | G06F 11/0739 |
| 2018/0060738 | A1* | 3/2018 | Achin .................... | G06N 20/00 |
| 2018/0089591 | A1* | 3/2018 | Zeiler .................... | G06F 3/048 |
| 2019/0086911 | A1* | 3/2019 | Xin .................... | G05B 13/0275 |
| 2019/0347148 | A1* | 11/2019 | Gomes Pereira ... | G06F 11/3466 |

* cited by examiner

INPUT        HIDDEN        OUTPUT

EMPATHY

CORPUS OF JUDGED RELIABILITY BY TOPIC AND SOURCE

VIGOROUS AI MODULATOR

ATTRIBUTION VALIDATION CREDIBILITY SCORE

FFT - EVOLVED AI ATTRIBUTION AND TOPIC
500

CORPUS OF HISTORIC NEWS WITH SOURCE ATTRIBUTION

TRAINING DATA

NLP NN ATTRIBUTION AND TOPIC

NEWS FEED

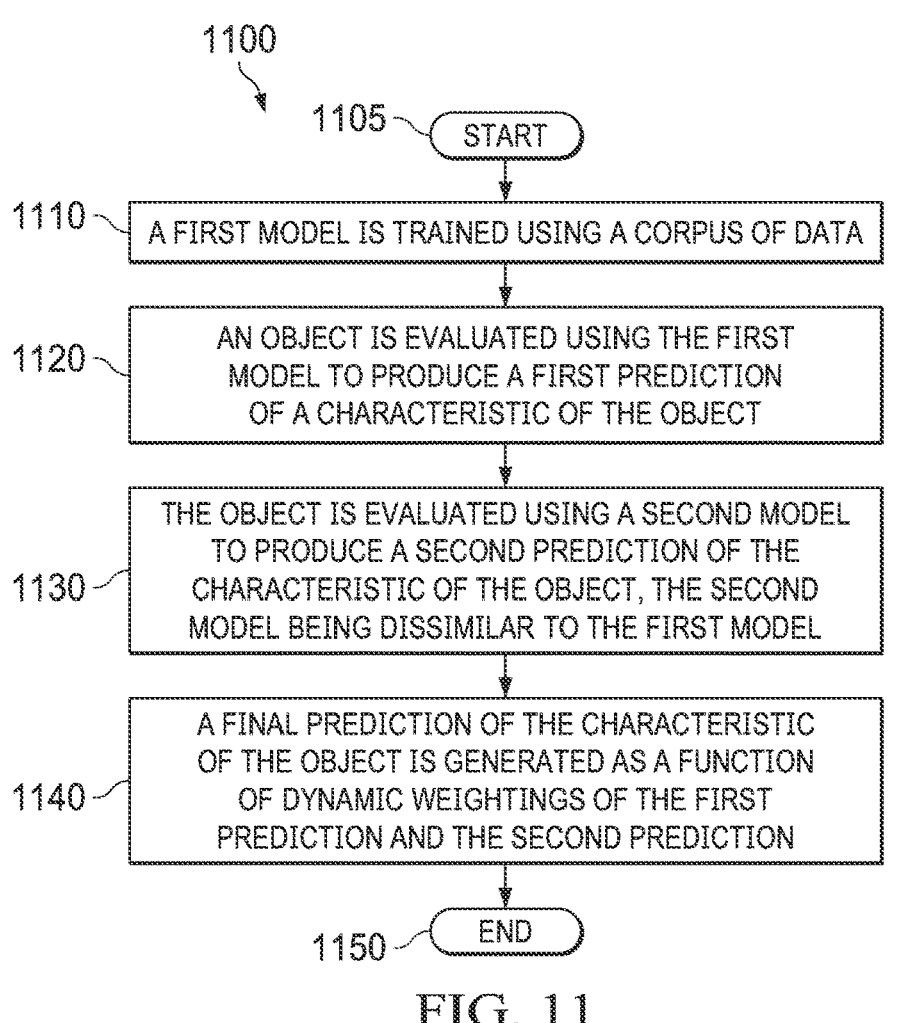

1100

1105 — START

1110 — A FIRST MODEL IS TRAINED USING A CORPUS OF DATA

1120 — AN OBJECT IS EVALUATED USING THE FIRST MODEL TO PRODUCE A FIRST PREDICTION OF A CHARACTERISTIC OF THE OBJECT

1130 — THE OBJECT IS EVALUATED USING A SECOND MODEL TO PRODUCE A SECOND PREDICTION OF THE CHARACTERISTIC OF THE OBJECT, THE SECOND MODEL BEING DISSIMILAR TO THE FIRST MODEL

1140 — A FINAL PREDICTION OF THE CHARACTERISTIC OF THE OBJECT IS GENERATED AS A FUNCTION OF DYNAMIC WEIGHTINGS OF THE FIRST PREDICTION AND THE SECOND PREDICTION

1150 — END

FIG. 11

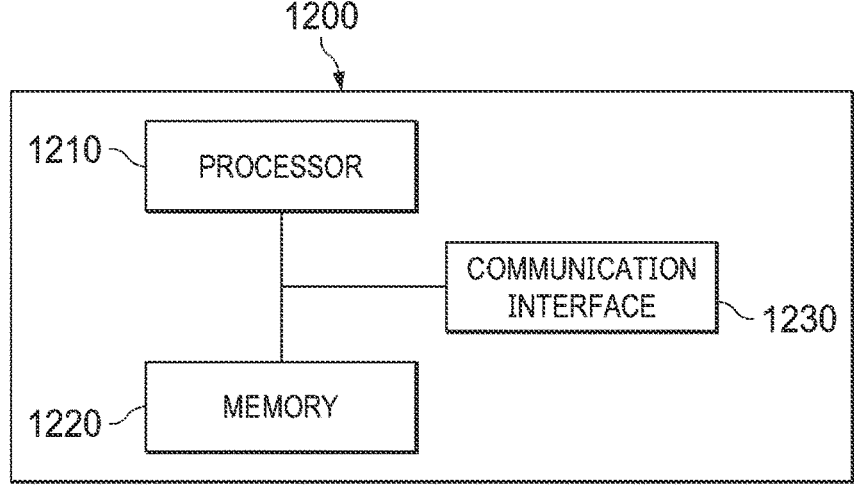

1200

1210 — PROCESSOR

COMMUNICATION INTERFACE — 1230

1220 — MEMORY

FIG. 12

SYSTEMS AND METHODS FOR USE IN OPERATIONS AND MAINTENANCE SYSTEMS FOR CONTROLLING THE OPERATION OF SECOND SYSTEM

CROSS-REFERENCE TO RELATED APPLICATION

This application is a Continuation of U.S. application Ser. No. 16/675,000 filed on Nov. 5, 2019, entitled "SYSTEM AND METHOD FOR VIGOROUS ARTIFICIAL INTEL-LIGENCE" which claims the benefit of U.S. Provisional Patent Application No. 62/756,044, entitled "HYBRID AI," filed Nov. 5, 2018, which are incorporated herein by reference.

This application is related to U.S. application Ser. No. 15/611,476 entitled "PREDICTIVE AND PRESCRIPTIVE ANALYTICS FOR SYSTEMS UNDER VARIABLE OPERATIONS," filed Jun. 1, 2017, which is incorporated herein by reference.

This application is related to U.S. Provisional Application No. 62/627,644 entitled "DIGITAL TWINS, PAIRS, AND PLURALITIES," filed Feb. 7, 2018, converted to U.S. application Ser. No. 16/270,338 entitled "SYSTEM AND METHOD THAT CHARACTERIZES AN OBJECT EMPLOYING VIRTUAL REPRESENTATIONS THEREOF," filed Feb. 7, 2019, which are incorporated herein by reference.

This application is related to U.S. application Ser. No. 16/674,848, entitled "SYSTEM AND METHOD FOR STATE ESTIMATION IN A NOISY MACHINE-LEARN-ING ENVIRONMENT," filed Nov. 5, 2019; U.S. application Ser. No. 16/674,885, entitled "SYSTEM AND METHOD FOR ADAPTIVE OPTIMIZATION," filed Nov. 5, 2019; and, U.S. application Ser. No. 16/674,942, entitled "SYSTEM AND METHOD FOR CONSTRUCTING A MATHEMATICAL MODEL OF A SYSTEM IN AN ARTI-FICIAL INTELLIGENCE ENVIRONMENT," filed Nov. 5, 2019, each of which are incorporated herein by reference.

RELATED REFERENCES

Each of the references cited below are incorporated herein by reference.

U.S. Patents

| Pat. No. | Issue Date | Patentee |
|---|---|---|
| U.S. Pat. No. 10,430,531 | Oct. 1, 2019 | Haye |
| U.S. Pat. No. 5,095,443 | Mar. 10, 1992 | Watanabe |
| U.S. Pat. No. 5,087,826 | Feb. 11, 1992 | Holler, et al. |
| U.S. Pat. No. 4,873,661 | Oct. 10, 1989 | Tsividis |
| U.S. Pat. No. 4,972,363 | Nov. 10, 1990 | Nguyen, et al. |

Nonpatent Literature Documents

Pontin, Jason "Greedy, Brittle, Opaque, and Shallow: The Downsides to Deep Learning" (2018)

Goodfellow I. J., Vinyals, O., Saxe A. M., "Qualitatively Characterizing Neural Network Optimization Prob-lems" (2014)

Izhikevich, E, "Simulation of Large-Scale Brain Models" (2005)

Sutton, R. S., and Barto, A. G., "Reinforcement Learning: An Introduction" (2018)

Kaplan A., and Haenlein, K., "Siri, Siri in my Hand, who's the Fairest in the Land?" (2018)

Chen, R. T. Q., Rubanova, Y., Bettencourt, J., and Duve-naud, D. "Neural Ordinary Differential Equations" (2018)

Jain, P, and Kar, P., "Non-Convex Optimization for Machine Learning" (2017)

Taleb, N., "The Black Swan—The Impact of the Highly Impossible" (2010)

Haken, H., "Information and Self-Organization" (2010)

Bazaraa, M, et al., "Nonlinear Programming: Theory and Algorithms" (2006)

Fouskakis, D., and Draper, D., "Stochastic Optimization: A Review" (2001)

Kelso, J. A. S., "The Self-Organization of Brain and Behavior" (1995)

Rumelhart, D. E., Hinton, G. E., and Williams, R. J., "Learning representations by back-propagating errors" (1986)

Lorenz, K. "Part and parcel in animal and human societ-ies" (1971).

Maestripieri, D. "Developmental and Evolutionary Aspects of Female Attraction to Babies" (2004)

TECHNICAL FIELD

The teachings herein are directed, in general, to opera-tions and maintenance (O&M) systems and, more particu-larly, to O&M systems employing methods to execute an operational or maintenance decision with respect to a second system as a function of a final prediction of a characteristic of at least one of a plurality of objects (i.e., components and/or subsystems) of the second system.

BACKGROUND

Kaplan and Haenlein define Artificial Intelligence (AI) as "a system's ability to correctly interpret external data, to learn from such data, and to use those leanings to achieve specific goals and tasks through flexible adaptation." The teachings herein deal with improvements to AI for large complex systems and data sets.

The current state of AI art has been described as "greedy, brittle, opaque, and shallow" because it requires vast amounts of data (greedy), is prone to breaking in new contexts (brittle), is usually an unexplainable black box (opaque), and encodes little innate knowledge and possess no common sense (shallow). The solutions, systems, and embodiments disclosed herein of "vigorous" AI (VAI) address each of those problems, enabling robust AI systems at large scale.

The term "vigorous" as used herein is borrowed from genetics and refers to the goal of hybrid vigor, a robustness that is produced from the marriage of dissimilar genetic contributors. This is in contrast to "obvious amalgams." Hybrid vigor addresses the problem of "fragility." We say some generic disorders create people who are fragile. Hemo-philia is an example; "Fragile X Syndrome" is another. Tough composite materials can be created from fragile components. Using a natural language interface to drive a customer service menu is an obvious amalgam. The user can say or dial "1" for reservations. The AI system is simply a substitute for other input methods. Anything fragile in the antecedents will be preserved within such amalgams. Dumping chunks of iron, carbon, nickel and chromium into a beaker and shaking will not generate stainless steel.

Obvious amalgams result from crude combinations. They are different than the careful genetic selection of corn or the bloodlines of champion animals. They lack the elegance of composite materials. They also lack the craftsmanship of high-performance metal alloys. Most complex AI systems today are "obvious amalgams." The term "OA" is used herein to refer to these obvious amalgams which are just system decomposition that assign numerical methods as part of an algorithm design. Not only is fragility not eliminated, some of these systems have the risk of compounding or cascading fragile attributes.

For the purposes of the teachings herein, assume machine learning is a subset of AI as illustrated in FIG. 1. There are three types of machine learning which depend on how the data is being manipulated. Supervised learning trains a model on known input and output data to predict future outputs. There are two subsets to supervised learning: regression techniques for continuous response prediction and classification techniques for discrete response prediction. Unsupervised learning uses clustering to identify patterns in the input data only. There are two subsets to unsupervised learning: hard clustering where each data point belongs to only one cluster and soft clustering where each data point can belong to more than one cluster. Reinforcement learning trains a model on successive iterations of decision-making, where rewards are accumulated because of the decisions. Table 1 (below) shows a sample of machine learning methods known in the state of the art.

"The four conditions" is a term we will use herein to refer to the requirements for DNNs to yield an approximation of the function represented by the data used to train the DNN. "T4C" means "the four conditions" and refers to the Universal Approximation Theorem, with specific reference to the Cybenko proof utilizing sigmoid functions, as described in more detail below. Also explained below are three types of T4C violations, to wit:

Type 1—Unavoidable T4C violations because of lack of insight to the underlying function;

Type 2—Ignorant T4C violations when the NN designer is ignorant of a knowable violation; and, Type 3—Willful T4C violations when the NN designer chooses to make a known violation Together, these violations are sometimes manifested in what amounts to an unsupported belief system; AI will somehow learn on its own. The Universal Approximation Theorem (UAT) seems (in this belief framework) to promise it.

All current deep AI and deep ML systems suffer from some combination of at least six limitations. To describe what VAI should be, and how it can exceed the limits of current AI systems, we list these "six limitations." These limitations are not exhaustive; there are other limitations which VAI can overcome, but these six illustrate some important principles of VAI, some of the value of VAI, and some features of VAI that will be understood by those skilled in the art.

In contrast, robust natural intelligence seems to involve both reinforcement learning of the type which inspired NNs originally, and "hard wiring" which exists in the structures

TABLE 1

| Regression | Classification | Soft Clustering | Hard Clustering |
|---|---|---|---|
| Ensemble methods | Decision trees | Fuzzy-C means | Hierarchical clustering |
| Gaussian process | Discriminant analysis | Gaussian mixture | K-means |
| General linear model | K-nearest neighbor | | K-medoids |
| Linear regression | Logistic regression | | Self-organizing maps |
| Nonlinear regression | naïve Bayes | | |
| Regression tree | Neural nets | | |
| Support vector machine | Support vector machine | | |

In this teaching, "AI" refers to all three methods such as Random Forests, as well as "Neural Nets" or NNs as illustrated in FIG. 2. And, we mean the classic NNs used by many AI practitioners. We also mean in most cases "deep" trees/forests or NNs, which have more than three layers and may have many thousand nodes. When we mean to emphasize "deepness" we use the term "Deep NN", as illustrated in FIG. 3, or "DNN," although those skilled in the art will understand there is no need for this distinction. There are other methods, known to those skilled in the art that are too numerous to elaborate. For AI classifiers, these include K-Nearest Neighbors, Cluster Analysis, Support Vector Machines, and Naïve Bayes systems. These are all included in our summary of current AI issues. We also do not need the distinctions between supervised, unsupervised and reinforcement methods, because as they are practiced today, theses variations fail to overcome the system level challenges we describe herein. Finally, we do not need to make a distinction between AI and Machine Learning (ML) for the purposes of this teaching.

We will use the term "nodes" to describe math objects in this teaching. In the case of NNs, the nodes are "neurons." For object-oriented software, the nodes may be objects. Because NNs do weighting math in their connectors, not just neurons, those might be considered "nodes" in some cases.

and chemistry of our brains. Lorenz (1971) and Maestripieri, (2004) showed humans are attracted with some combination of positive feelings, empathy and a sense of protection to faces which are rounded, with large eyes, such as those of infants. This spans ethic and cultural boundaries, and even extends to other species. It explains why many "lovable" cartoon characters have baby-like features.

It's reasonable to speculate humans have "hard wiring" similar to that illustrated in FIG. 7. Having recognized a face, humans will attenuate a fear response, and emphasize an attraction response to faces like those on the right side of FIG. 7. Fear might be amplified, and empathy attenuated, when presented with faces on the left side. The final response from a human will be a based on the context of seeing the face. No one set of learning or hard-wired responses alone will dictate the reaction. This is one example of how learned responses are integrated with native (hard wired) responses in the functions of human intelligence. This vigorous AI inspires the teachings herein.

The VAI described herein can either avoid bias in data and labeling by humans who respond as shown in FIG. 7 or can exhibit human-like ethical responses to defend against predators on the left side of FIG. 7, and defend the weak, on the right side of FIG. 7.

The six limitations described next are in contrast to the vigor taught herein.

Limitation #1—Questionable Convergence

One of the causes of the first AI winter was a discovery by Minsky in 1969; two-layer neural networks may not successfully converge. A reason for the first thaw ending the AI winter was adding middle or so-called "hidden layers." This could accurately approximate a wide range of functions. Proofs of this are known as the "Universal Approximation Theorem." The first of these UAT proofs was done by George Cybenko in 1989. The hidden layers ushered in Deep Neural Networks (DNNs). There are, however, limitations to the proofs. UAT only holds for finding functions from data which are:

1. nonconstant;
2. bounded;
3. monotonically-increasing; and,
4. continuous.

Violation of any one of the four conditions (T4C) means that just as Minsky proved for two-layer NNs, even a deep NN may not yield a feasible working function. Further, these four are not the only challenges to mathematically correct application of deep networks. UAT assumes a single hidden layer. Thus, deep networks may violate this and other assumptions. For the sake of simplicity in this teaching, we focus on T4C, which should be understood to include violations of other mathematical integrity issues present in NN or other AI implementations.

Because some DNNs are considered "useful" when they are 85-95% accurate, T4C failings may be overlooked. The 5-15% error rate may contain cases where the DNN can never converge because the underlying function violates one or more of the four conditions. But for many current applications of the DNNs this doesn't ever matter. The productivity and speed of the DNN makes the error rate acceptable. In applications like web searches, image identification, character recognition and natural language "being less wrong" is a major victory. However, it seems likely that DNN advocates and users don't know when they are violating T4C. Indeed, in many cases, they cannot know (Type 1 T4C error).

When we roll a die, we get one of six outcomes. If we treat them as numbers, they are not continuous. We might know this, if we know the data comes from dice. We can devise means to work around this discontinuity; but only if we know about it. Terabyte data sets have data elements which are like the die: i.e., not continuous. But that insight is often lacking. In large data sets, there are often other data elements which violate other conditions for UAT. For example, ranges may be unbounded, but appear bounded because of sensor or sampling methods; constant data might appear non-constant due to noise; and, monotonicity might be an illusion due to rarity or survivor bias.

We often use airplanes to illustrate the last topic. The control yoke, elevator position, angle of attack and rate of climb seem well correlated and monotonic until experiencing aerodynamic stall. Since control systems (human and other) work hard to avoid stalls they are exceedingly rare in the data. One pilot said there is roughly one stall per million hours of commercial airliner flight. That might be an example of being right 99.9999% of the time and wrong once in a million times you badly need to be correct.

Failure to converge is also a problem for AI methods other than NNs. Decision tree methods of all sorts (including random forests) are vulnerable to most of the problems described above, even if errors manifest somewhat differently. The tree methods require enumeration of every alternative for a branch. Rarity will mean some important branches are either unknown or misrepresented in the data. This summary of convergence issues is not exhaustive, as will be understood by those skilled in the art.

Limitation #2—Approximating Flawed Systems (Including Messy Humanity)

An important application of AI is to approximate the response of a human to sensory experiences. For example, to "read" characters on a page or a check (and have done this for decades). Successful and important examples of these AI applications are classifiers. In this, we attempt to classify what a human would say about a digital input we provide to the AI, for example:

Is the picture a cat?

Is the person looking at the picture likely to buy cat food?

Is the phone call in Farsi?

Is the Farsi conversation about a terror plan?

Is the word "lawyer" the same as "attorney" or "barrister"?

In the early days of AI, there was hope we roughly understood human cognition. But now we know how little we know about how humans do these things. So, while we ask humans to train classifiers, we don't know what goes on inside the human cognitive and limbic systems. So, we don't understand:

Why a picture is labeled "cat."

Why we think a language sounds like Farsi vs Swedish.

Why hemispheres of the brain seem to separately study the lower and upper half of faces.

Why risk and uncertainty are perceived in highly nonlinear (and often irrational) ways as documented by Bernoulli and carefully measured by Kahneman and Tversky.

Why squirrels have better recall about where they left things than humans.

Why pigeons can reason in the face of uncertainty better than humans.

Exactly how context helps us tell when a spoken work "counselor" means an advisor, a lawyer, or a psychologist.

The person who can explain linguistic differences between Farsi and Swedish doesn't use that knowledge. They listen, and something happens, probably in the left hemisphere of the brain. The right hemisphere might understand phonetic rules and even contradictory evidence, but the right side won't be consulted. The expert's left side will snap to a judgement.

Humans exhibit both instinctive, and reasoned responses. This duality is an indication of higher intelligence missing in AI. This gap has persisted in spite of the long-understood need to deal with uncertainty in AI processing, for example Nguyen, et al. When we say, "that's a cat" we do this same snap; we don't make an inventory (whiskers, paws . . . ). In the same way, brain science makes a distinction between procedural memory and declarative memory.

"Procedural" refers to remembering how to do things such as riding a bicycle, playing piano, or hitting a golf ball. Some procedural memories enable complex skills. The equations of motion describing bicycle dynamics are beyond the comprehension of a child who, nonetheless, learns to ride.

"Declarative" refers to memory of facts and events which can be consciously recalled or "declared" and consists of information that can be explicitly stored and retrieved. A mechanical engineer might be able to remember the dynamics equations for a bicycle, but still be unable to actually ride one.

These memory types are also related to different areas of the brain, and different brain structures. We know the left hemisphere of the brain seems to dominate speaking and articulation of decision. The left side of our brain is particularly good at categorical, crisp decisions. But it's not very good at shades of gray. The result is that often AI classifiers risk being trained to reflect the overconfident, categorical and deterministic view of the left hemisphere. Worse, the left hemisphere omits much of what the right hemisphere knows. Shades of meaning and multiple meanings are often ignored by the left. The right side can make judgements about humor sarcasm and deceit. But the left side is unable to report the rationale for the right side's sense of these multiple meanings. Similarly, the right side can better deal with shifts over time. Time flows with more ease on the right side. The left hemisphere, when it speaks or classifies is more comfortable with static truth. So, multiple truths or states, changing over time can be lost unless careful elicitation methods allow the right hemisphere to share its knowledge.

The tendency of the human left hemisphere to dominate AI training may explain why some AIs "go rogue." This happens most often when we ask an AI to seek an optimal strategy. As one author pointed out, ask for an optimal fishing strategy, and the AI may choose to drain the lake.

We can probably train an AI system to remember the location of nuts better than a squirrel. But we can't train the NN to be better at the Monty Hall problem than pigeons if we train it based on human responses. Humans can't easily grasp the concept of changing strategy with subtle added information. And, humans are bad at overcoming left brain biases without careful training.

Those skilled in the art will recognize other limitations from AI based on human labels and inputs. When humans are used to label data, or classify results, we are at risk of losing much of what matters in realistic human judgement. Because the classifiers are mimicking humans who create the labels and classifications, DNNs and random forests embed the biases, heuristics, non-linearities and other messy errors of humans, inputs, including errors from boredom, greed, and ignorance.

Limitation #3—Unexplainable

Numerous studies have shown how decision makers resist recommendations from black boxes. For DNNs, with thousands of nodes and many more connectors, it seems unlikely we can expect to grasp what the NN is doing, or why. Although there are efforts to create "explainable AI", it seems likely this will be intractable for DNNs above some size. Random forests can be somewhat more interpretable, but still resist explanations. First, random forests are usually treated as a black box because they are constructed from many deep trees. Each tree is trained on "bagged" (or otherwise organized) data using random selection of features. Understanding a decision process by examining individual trees defies human capacity. Examination of a given tree is only feasible if it is shallow (little depth) and simple (few features). Deep NNs and Deep tree-based models are deeply resistant to explanation; this seems unlikely to change. Unexplainability has been well described and is familiar to those skilled in the art, without further elaboration.

Limitation #4—Hidden Linearity

Another problem is that the most powerful uses of DNNs require non-linearity which may never be achievable. There are two hints suggesting there is linearity deeply rooted in the unexplainable AI.

First, two of UAT's requirements (continuity and monotonicity) suggest something linear is going on. Perhaps only linear in a transform hyperspace, but linear in some sense. These seem implicitly linear. Space does not permit a full exploration of these two major limitations. The real world is discontinuous at all levels from quantum states, to business rules. Reality is rarely monotonic. For tree methods, averaging of bias terms and feature influences dominate the performance of the tree. These methods are often explicitly linear, even if the world is not. UAT is based on assumptions which are roughly equivalent to assuming cows are spherical.

Second, Google's work on using Stochastic Gradient Decent (SDG) to optimize NNs is based on linear principles. Some quotes are reproduced below from a paper entitled "Qualitatively Characterizing Neural Network Optimization Problems":

"Neural networks are generally regarded as difficult to optimize. The objective functions we must optimize to train them are non-convex and there are few theoretical guarantees about the performance of the most popular algorithms on these problems. Nevertheless, neural networks are commonly trained successfully and obtain state of the art results on many tasks."

"We show that there exists a linear subspace in which neural network training could proceed by descending a single smooth slope with no barriers."

"This work has only considered neural networks that perform very well. It is possible that these neural networks perform well because extensive hyperparameter search has found problems that SGD is able to optimize easily, but that other hyperparameters correspond to optimization problems that are too hard. In particular, it seems likely that very large neural networks are easier to fit to a particular task."

Those skilled in the art will recognize the dangers of assuming linearity and the difficulty of avoiding it.

Limitation #5—The Curse of Dimensionality

DNNs, Random Forests and other deep AI are also used for classification, such as processing images and natural language are huge. In tutorials, NNs and trees are shown with only a few nodes. In practice they can be exceptionally large: thousands or millions of nodes, and millions or billions of connections. For the purposes of this teaching, we refer to these very large AI representations as having "undesirable depth" or "unnecessary depth." Those skilled in the art will understand that after training a DNN, experiments show that much of the network can be pruned without losing significant performance under normal circumstances. It is apparent the depth of the NN is unnecessary and undesirable. But it is only apparent after training and testing. It is an objective of this present teaching to avoid the problem of undesirable depth despite the use of data sets with high dimensionality.

True/False distinctions are at the heart of DNN training Babbage anticipated this in the 9th Bridgewater Treatise, Chapter 1, to wit: "It is a condition of our race that we must ever wade through error in our advance towards truth; and it may even be said that in many cases we exhaust almost every variety of error before we attain the desired goal." But exhausting every variety of error is exhausting; and, it becomes more exhausting as the number of dimensions expands.

Those skilled in the art will recognize that even when data sets have moderate dimensionality NNs for image processing can expand to millions of neurons and a billion connection weights. If we want to train a NN to recognize cats, we need someone to select pictures which do (and do not) have cats in the image. We need humans to help curate sounds (phenomes), images and language to create the labels we need for classifier training In some cases, smaller NNs have been trained (e.g., to find faces) to select images for a DNN training set. This is still selection and classification based on human classification and selection. It may help with the curse of dimensionality for data curation, but it still leaves problem #2 (the human biases are still in there). Moreover, humans still need to check the selection NN, lest the DNN be fed a poor-quality training set.

The final form of dimensionality's curse is the lack of big data. Large NNs and deep forests require massive amounts of data for training. The sheer scale of the training sets is a challenge, and a curse of dimensionality. This may not be exactly what Richard Bellman meant when he coined the term "curse of dimensionality." Bellman may have been more interested in the explosion of math operations in high dimensional data sets. But sparse data is also a challenge.

Lack of data manifests itself in at least three forms of data scarcity. The first form of data scarcity is the most commonly understood; as dimensionality increases the data volume in the hyperspace increases such that even massive data sets are too sparse for training purposes. For example, if we would like to have a large data set faces for training with just 200×200 RGB pixels, and only two bytes per color, each face is $2.4×10^5$ bytes. If have a million faces, we now have $2.4×10^{13}$ bytes, or 24 terabytes. Is that enough? Now, we want to have a statistically representative sample across all ages, races, genders. There are only about 100,000 Inuit people in the world. If we drew our million faces randomly, we probably have something like 100 of them, and only 50 men. If we want old Inuit men, we probably have less of them than old Inuit women, and not a statistically significant sample. Crees, Corsicans, Hereros, and Samoans are other examples of small ethic groups with distinct features. To cover them all, we probably need something more like half a billion faces, or more. If we had more than just three dimensions (age, race, gender)? The space becomes brutally sparse.

The second form of data scarcity is characterized data; even sparse data must be labeled for training purposes. This means enormous work for someone. For example, some medical imaging data sets are of limited size and reflect high error rates in diagnoses. Even Google has problems finding characterized data. It seems likely Google Translate leans heavily on Bible translations for natural language training. The Bible has about 800,000 words and deals with a wide range of human activity (farming, families, wars, governments . . . ). It has been translated into hundreds of languages, and some of them have multiple translations (diverse ways to say roughly the same thing). Portions of the Bible have been carefully translated to more than 1,500 languages. Would it be better for Google translate to have something other than a religious text? Certainly! Can we find anything else with this span? No. As a result, Google Translate occasionally introduced religious ideas in secular sentences. The scarcity of characterized data creates bias, and often we can't know what those biases are.

Car companies take their cars to test in statistically rare conditions (hot, wet, cold . . . ) which is slow and expensive. This requires humans to transport the cars, and humans to drive them. Whether testing cars, translating rare languages, or labeling medical images, characterized data is often rare because it is slow and labor intensive. And, when this is done, it is not "big" in many cases.

The third form of data scarcity is provenance; even when data is available and labeled, it may come from the wrong era, or from a questionable source. To know we have authoritatively represented a data set requires provenance. Lack of it has led to some tragic stories.

To cope with the curse of dimensionality, several methods are used which implicitly or explicitly reduce the number of dimensions in a data hyperspace, some, like cluster analysis and principle component analysis are also used to generate analytic results. But cluster analysis and feature reduction methods risk obscuring important system features. This is a particular risk for rare system states, and/or rare circumstances. But often these rare "black swans" are the most important circumstances which the system must respond to. These methods make AI "shallow."

Limitation #6—The Pull of Error

Because AI can be hungry for Big Data, it can be prone to ingest erroneous data. Forests and NNs can be pulled toward error. Errors in data distorts AI training, and future uses of the AI will be affected by these distortions. The errors can take at least three forms. All three are made more difficult with the curse of dimensionality. But incorporating error is distinct from the curse, even though these limitations often team up to attack the utility of Deep Forests and DNNs.

The first form of erroneous data is accidental proportionality bias. This is also known as sample bias. In some cases, this form may overlap with messy human biases. Kahneman says, "what you see is all there is," meaning your paradigms about something block out all other information on that subject. Clearly, we should expect human inputs to reflect proportionality bias. But there are other causes which make this form of error distinct. For example, there are several wireless OBD2 (On-Board Diagnostics—2) data readers. These devices connect to the data bus in cars, and relay status of the engine and other systems. If every car had one, we might be able to collect unbiased data. But people buy these data readers to troubleshoot their autos. We'd expect there would be a much higher proportion of malfunctioning cars in the wireless OBD2 data stream. Even the malfunctions will be distorted. OBD2 data can be used to find out why the check engine light is on. But we don't need it for flat tires or leaking radiators. And, we can't use it when there is a major electrical fault and the computers fail. We can't use it when the computer boards burn out.

To make matters more complicated, luxury cars have more sensors reporting on OBD2 than economy cars. Looking at OBD2 data only, we might conclude that low tire pressure is more common on luxury cars, because each tire can send a low-pressure warning. Less expensive tires use a logical OR function. 1, 2, 3, or 4 low tires all send the same low tire warning.

So, we see bias is lurking everywhere. There are too many forms of accidental proportionality bias to list. This is a central challenge in opinion polling, and it is the central problem in political opinion polling. Because of the curse of dimensionality, there is great temptation to ignore proportion bias, or to believe we can correct for it. But, as the number of dimensions increases, the curse of dimensionality makes proportion bias more likely.

If we have a data set with five kinds of observations, and a 90% confidence that each of them is truly randomly sampled (no bias), then we are still at elevated risk. We have about a 40% chance bias has snuck into our data base somewhere, and we probably don't know where it is. The odds are only a little better than 50-50, which limits the places we can apply it. Looking for these errors is, as Babbage might have said, exhausting.

As seen in Table 2, showing bias risks versus dimensionality, a data set with the same five dimensions (e.g., pixels with RGB and x, y location) and an 80% chance that each of these is unbiased, has only a 33% chance of avoiding bias in the resulting dataset.

TABLE 2

| Dimensions | Odds Each Dimension is Unbiased | | | |
| | 99% | 90% | 80% | 70% |
| --- | --- | --- | --- | --- |
| 2 | 98% | 81% | 64% | 49% |
| 3 | 97% | 73% | 51% | 34% |
| 4 | 96% | 66% | 41% | 24% |
| 5 | 95% | 59% | 33% | 17% |
| 6 | 94% | 53% | 26% | 12% |
| 10 | 90% | 35% | 11% | 3% |
| 100 | 37% | 0% | 0% | 0% |

Table 2 shows how the risk of bias combines with the curse of dimensionality. Even if we have a 99% chance of avoiding bias in our 5-dimensional example, we'd expect that about 5% of the time, we'll end up with bias sneaking in. So, one out of every 20 AI models we build will exhibit errors from bias.

Some current AI implementations partition functions as shown in FIG. 4. Since these tend to be serial implementations, the error rates compound across the system. These do not exhibit vigor, but instead are fragile. If the speech-to-text NN is 85% accurate, and the natural language processor is 90% accurate, and the recommendation engine is 70% accurate, then the system a 53% chance of making good recommendations.

Challenges in usefulness of plural AI implementations are a well-known problem, as seen in U.S. Pat. No. 5,095,443, by Watanabe, entitled "Plural Neural Network System Having a Successive Approximation Learning Method." Those skilled in the art will see that we have extremely poor odds of avoiding bias and error in moderate to high dimensional data sets. Further, portioning by obvious amalgams fails to provide vigor, and often creates fragility.

The second form of erroneous data is accidental pollution. Humans entering data into the wrong field is one example. Computer autofill/autocorrect is another. Those skilled in the art will recognize there are many other examples. For large industrial data sets a common form of accidental data pollution comes from sensor pathologies. Sensors can be failing. They can be installed at the wrong spot. They can be calibrated incorrectly. They can pick up information other than what was intended; vibration sensors are notorious for this. Humans exhibit these errors when they are less than perfect sensors. Hearing loss, tinnitus, color blindness and other sensory limitations create skew in human perceptions and reporting.

Accidental errors create the need for "data cleaning" in most data science projects. In many cases, this is the most time-consuming part of a project, and it rivals data labeling for the most expensive part of many projects.

The third form of erroneous data is intentional poisoning. Because bad actors are so clever, and because automated deception is so cheap, there are no practical limits to this category. A server full of bots, each one with a fake persona, can "come to life" on Facebook, Google+, LinkedIn, Twitter, and even Bitcoin's blockchain. Each of these thousands or even millions of non-persons can "live" model lives on the web. Chatting away and responding with likes to real persons. When tasked, the bots can create, repeat, like, or otherwise promote disinformation. In the article, above, you see the story of how a propaganda hashtag propagated across the web from weaponized bots.

Organized lying is not limited to bots. There are professional trolls, usually employed by state actors who spew untruth for one reason or another. State-sponsored propagandists are not the only actors motivated to pollute data. The LIBOR scandal shows how tempting it is. Barclay's bank colluded with other major institutions to falsify lending rate information. This allowed Barclay's traders to be far more profitable; but it distorted the lending costs of hundreds of trillions of dollars of debt around the world.

There are many motivations for intentional data pollution, and those skilled in the art will recognize these examples are not exhaustive.

To summarize concerns, the six limitations are not the only ones that make AI approaches vulnerable and fragile. But these six illustrate why current deep methods are difficult to employ in many instances:

Current AI and ML approaches may not reliably converge.

They can embody a wide range of subtle errors including human foibles.

They are often impossible to explain.

They risk forcing a smooth or even linear representation of non-linear reality.

They are cursed by dimensionality, require data on a scale which is often impossible to obtain and demand unachievable diversity or, force the reduction of dimensionality and impose the danger of shallowness.

They are prone to data driven contamination both accidental and malicious.

There are probably at least 6! (factorial) combinations of these problems, even if we ignore sub-types.

In view of these limitations in the art of artificial intelligence, particularly in the form of Vigorous AI (VAI), what is needed is a system and method that is not greedy, brittle, opaque, or shallow in execution of its functionality.

SUMMARY

Disclosed hereinafter are systems and methods for operations and maintenance (O&M) systems for controlling the operation of a second system, wherein the second system includes a plurality of objects (i.e., components and/or subsystems). In general embodiments, the O&M system comprises means for evaluating at least one of the plurality of objects using a first model to produce a first prediction of a characteristic of the object; evaluating at least one of the plurality of objects using a second model to produce a second prediction of the characteristic of the object, the second model being dissimilar to the first model; generating a final prediction of the characteristic of the object as a function of dynamic weightings of the first prediction and the second prediction; and, executing an operational or maintenance decision with respect to the second system as a function of the final prediction of the characteristic of the at least one of the plurality of objects.

In certain embodiments, the means for executing an operational or maintenance decision comprises at least one of: means for modifying the operation for the at least one of the plurality of objects comprising the second system; and, means for scheduling a maintenance action for the at least one of the plurality of objects comprising the second system. The O&M system can further include means for receiving data from one or more sensors associated with each of the plurality of objects. In such embodiments, the means for evaluating the at least one of a plurality of objects comprises means for utilizing the data from the one or more sensors as input to the first and second models. The means for evaluating the object using the first or second models further comprises means for determining a quality of the first or second predictions, respectively. The quality can be, for example, a measure of the confidence in the prediction. In related embodiments, the dynamic weightings are a function of the quality. The dynamic weightings can also be a function of at least one external input, or at least one predefined rule. The means for evaluating the object using the first and second models can also be executed in parallel.

In exemplary embodiments, the first model comprises a neural network. In such embodiments, the O&M system can further include means for training the first and/or second model using a corpus of known data. In related embodiments, either of the first and second models can be a Fast Fourier Transform.

The foregoing has outlined rather broadly the features and technical advantages of the present disclosure in order that the detailed description of the disclosure that follows may be better understood. Additional features and advantages of the disclosed embodiments will be described hereinafter, which form the subject matter of the claims. It should be appreciated by those skilled in the art that the conception and specific embodiment disclosed may be readily utilized as a basis for modifying or designing other structures or processes for carrying out the same purposes of the present disclosure, and that such equivalent constructions do not depart from the spirit and scope of the disclosure as set forth in the appended claims.

BRIEF DESCRIPTION OF THE DRAWINGS

For a more complete understanding of the present disclosure, reference is now made to the following detailed description taken in conjunction with the accompanying drawings, in which:

FIG. 11 illustrates a flow diagram of an embodiment of a method of evaluating an object to predict a characteristic of the object; and FIG. 12 illustrates a block diagram of an embodiment of an apparatus for predicting a characteristic of an object.

Corresponding numerals and symbols in the different figures generally refer to corresponding parts unless other-wise indicated and, in the interest of brevity, may not be described after the first instance.

DETAILED DESCRIPTION

Figure 1:
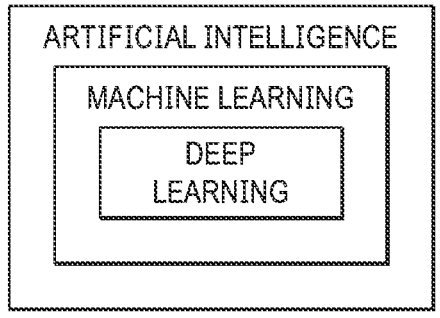
FIG. 1 illustrates a block representation of artificial intelligence, machine learning, and deep learning hierarchy.
Figure 2:
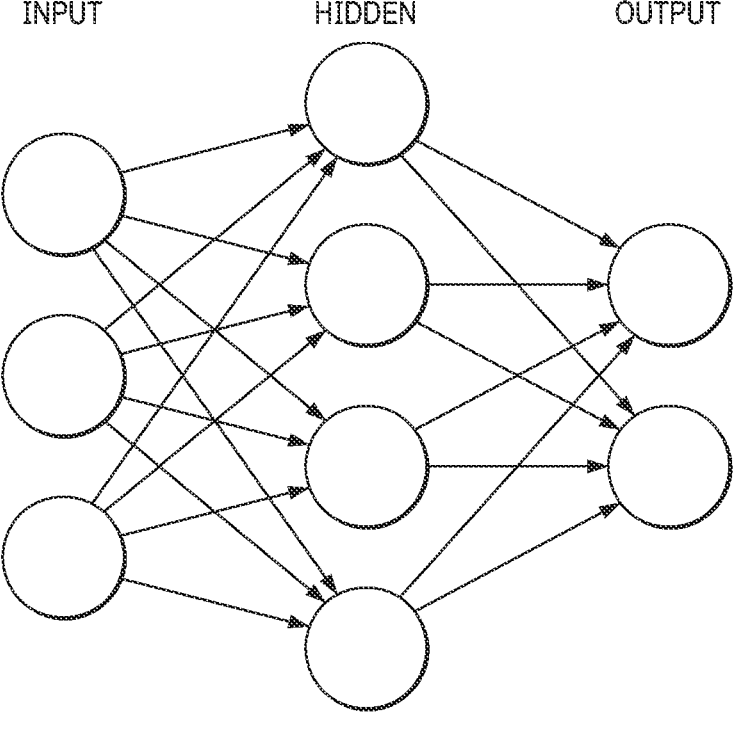
FIG. 2 illustrates a graphical representation of an artificial neural network.
Figure 3:
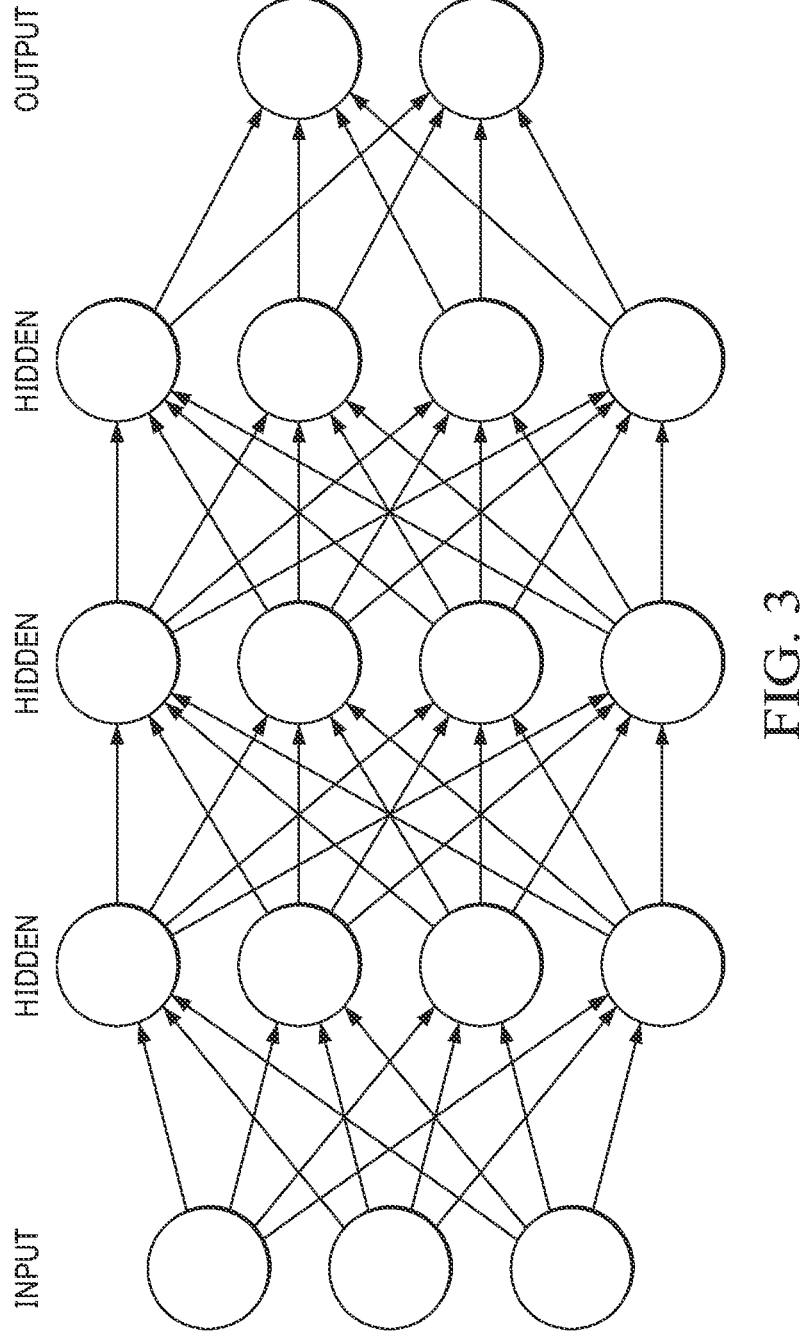
FIG. 3 illustrates a graphical representation of an artificial neural network for deep learning.

The making and using of the present exemplary embodiments are discussed in detail below. It should be appreciated, however, that the embodiments provide many applicable inventive concepts that can be embodied in a wide variety of specific contexts. The specific embodiments discussed are merely illustrative of specific ways to make and use the systems, subsystems, and modules for predicting a characteristic of an object. While the principles will be described in the environment of artificial intelligence systems, any environment such as a general modeling system is well within the broad scope of the present disclosure.

This process introduced herein seeks to achieve advantages by a method and system based on AI segmentation. Avoiding undesirable depth by segmentation can be understood by examining primate brain functions. Neurological functions are segmented. The left and right hemispheres have different primary functions. In ground feeders, one side is tuned to find food, the other to be wary of predators.

Segmentation in humans is extraordinarily complex, and our understanding is incomplete. A great deal has been written on this which does not need to be repeated here. From a system architecture standpoint, some of the strategy seems to be avoiding undesirable depth. Excessive depth imposes several penalties, including long processing time, bandwidth demands, being poorly explainable, and slower learning.

An error from the early days of AI was based on a false assumption. There was an idea that our brains are one large neural network. The connector between hemispheres, the corpus callosum, was poorly understood in the 1960's, and its function was unknown in the days of Turing and von Neumann. As the fundamental approaches of AI were established, we believed the corpus callosum was the connection between brain hemispheres. This unfortunate (and limited) paradigm helped prop up the idea of the brain as one big neural network. Consider the following timeline:

In 1943, neurophysiologist Warren McCulloch and mathematician Walter Pitts wrote a paper on how neurons might work, modeling a simple neural network using electrical circuits.

In 1949, Donald Hebb wrote The Organization of Behavior, pointing neural pathways are strengthened each time they are used (laying the ground work for weight adjustments).

In the 1950's, Nathanial Rochester from the IBM research labs attempted and failed to create NNs in a computer.

In 1959, Bernard Widrow and Marcian Hoff of Stanford developed ADALINE and MADALINE, the first neural network applied to a practical problem: echoes on phone lines. The system is reportedly still in commercial use.

In 1962, Widrow & Hoff developed a weight change learning procedure which eventually influenced the development of deep methods The foundations of today's AI were firmly laid before neuroscience discovered the function of the corpus callosum. It was much later that we discovered the importance of inhibition.

By the early 21st century, we began to see the corpus callosum was not just a collection of connections. Today, we know it is better understood as a boundary bridge. It allows some traffic to cross between hemispheres and inhibits other traffic. In other cases, it seems to integrate data from both hemispheres.

Understanding brain scans progressed along the same lines. Early researchers assumed active areas were doing processing. Now we understand that neural activity can be both inhibitory and excitatory; connecting and processing, or, overriding and blocking. Segmentation seems to occur at multiple levels, not just between hemispheres.

These three functions (excitation, integration, and inhibition) are poorly represented in AI made of obvious amalgams. Primate biological systems are more elegant and subtle. Segmentation allows our brains to process information faster, in different ways. Both system processing speed and system process diversity deserve additional observations.

Referring to Izhikevich's brain model, recall that he reported one second of "brain" processing time required 50 days of Beowulf cluster run time. Clearly smaller networks with parsimonious connections are needed to improve speed.

Considering system diversity, we can understand our world and our own body's senses in several ways at the same time. Like the ground feeding bird looking for both food and prey, we interpret our surroundings and ourselves for different purposes and in different ways simultaneously.

Better understanding of brain functional segmentation has made the brain more explainable. Today, we have rough understanding of how we process images, understand speech, and some subtle differences, such as the difference between words we read, words we speak, words we type, and words we hear. We know the regions of the brain which recognize word (and other symbols) are separate from the parts of the brain which understand their abstract meaning. One brain area knows the word cat. A different area has the rich understanding of the abstractions associated with cats.

Mapping of brain functions has made our big human neural nets more explainable than many DNNs. It should be clear how functional partitioning of a system would support explainable AI.

Vigorous AI mimics these biological segmentation principles. For example, consider four different "digital twin" types, each representing a system with rotating machinery. Imagine we build a system with sensors and processing as follows:

A stochastic network Fast Fourier Transform (FFT) trained on thermal and acoustic sensors observing the system.

A failure model based on what Box called "mechanistic" cause and effect and constrained machine learning (e.g., Kalman filters) predicts system failure (failure twin).

A model (also "mechanistic" with constrained machine learning) built from the design team's engineering models, represents how the machine should perform (performance twin).

An "as-built" model represents the constituent parts that make up the system, and that can be compared to other similar systems.

These four systems can operate with reasonable speed, and with parsimonious sensor installations. They will each reflect a view of reality. In some ways this mimics the genetic performance of a "four-way cross." But, unlike selective breeding, we are not constrained by a fixed ratio of contribution. Most so called F2 hybrids include a fixed ratio of genetic contribution from four pure breeds. But we can dynamically change the contribution of our four twins, for different functions, and under different conditions. In biological neural processing, such dynamic shifts seem to be plentiful.

Figure 5:
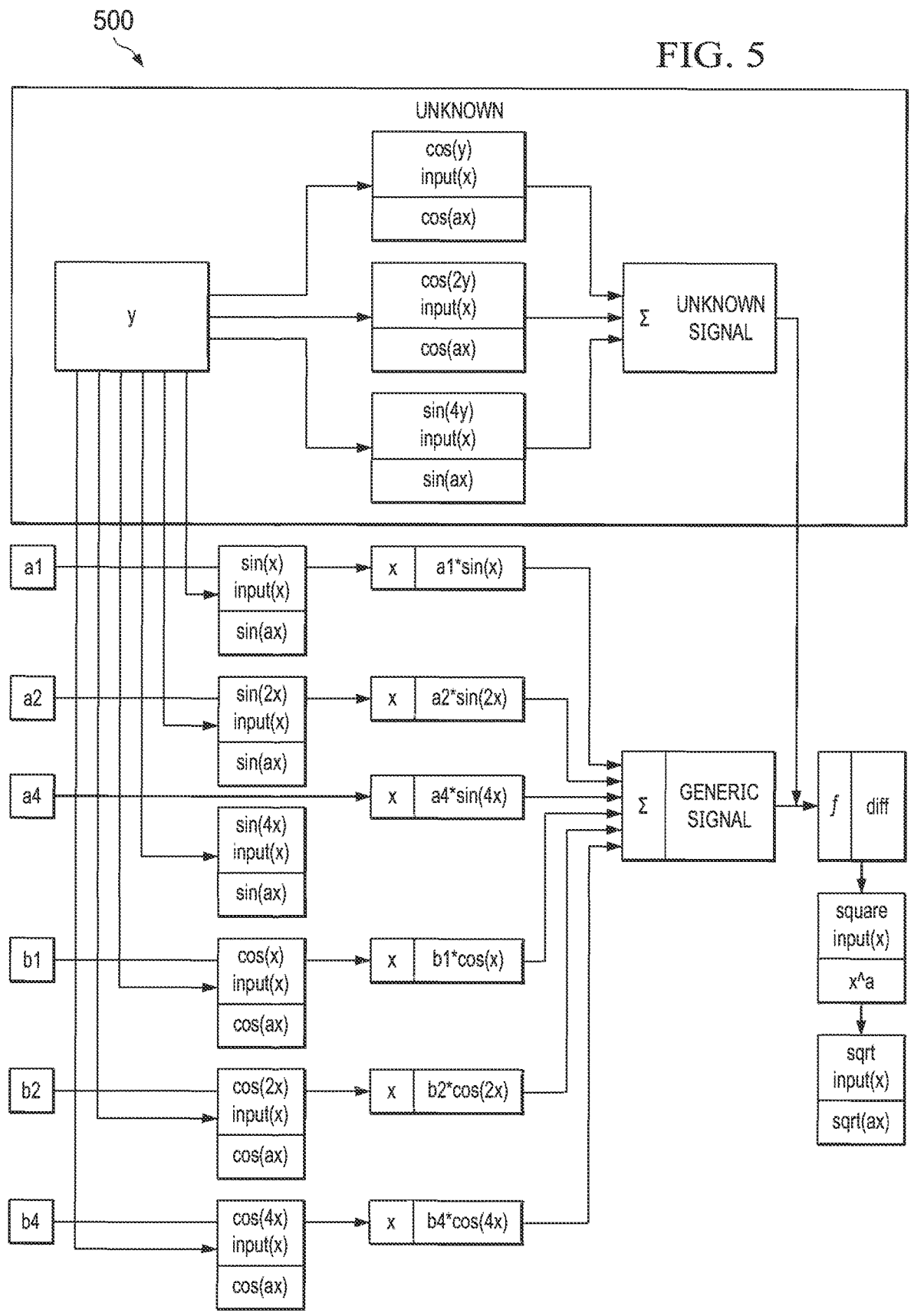
FIG. 5 illustrates a block diagram of a mathematical model for Fourier series as used in evolved artificial intelligence.

The four-way cross example can be applied to a system for monitoring and managing rotating equipment. Vibrations from various system components can be processed by an FFT-based network 500 as illustrated in FIG. 5, in accordance with an embodiment, as well as the other four components described above. In this example, the stochastic network FFT and performance twin can both suggest "something is wrong" by comparing the observed state to a learned normal state. These are near real-time anomaly detectors. But they may be prone to false alarms. For example, induced vibration from an external source might mimic vibration from within the rotating system. Their combination is likely to be more explainable than the FFT which only knows something is off, and faster than performance twin which might have time constants in its ML set to avoid false alarms, or to limit edge system processing needs. In fact, when we use them as something other than an OA, we can intentionally set them up with different response times and false alarm rates, to create a hybrid which outperforms either model alone.

The failure twin can suggest something "will be wrong" long before the DNN or a performance twin, under many circumstances. And, the failure twin can say "why" a failure is predicted. It is explainable. When the long-term failure prediction is added to the system, we have an even more powerful hybrid. We achieve more vigor because attention can be focused toward likely failures before the other system components can detect them. This allows dynamically setting the thresholds in the system components to levels which might otherwise create an unacceptable level of false alarms.

Both digital twin models can operate with simulated (virtual) sensors where none exist in the physical world. Both can feed the FFT with data which might not otherwise exist because of missing sensors.

Because the twins described in this example are mechanistic, they can encode vast amounts of information efficiently. We can write the equations of even complex orbital mechanics quite briefly. The training data set to create an equivalent DNN is vast and the DNN would be huge. We avoid this complexity by partitioning mechanistic understanding to the twin subsystems. Both twins are mechanistic, so they are more or less immune to data bias.

The system with rotating machinery is an example. It illustrates how hybridization of these four twins can be far more powerful and reliable than reliance on a single model. It also illustrates how assigning different kinds of AI and ML provides improved explainable (transparent) predictions and prescriptions. It shows how we might extend the performance of an AI which can only predict problems and generate highly targeted prescriptions. It shows how we can be frugal in our system's demands for sensors, processing and bandwidth, while exceeding the performance of systems which are greedy and fragile.

The Vigorous AI described in this example blends machine learning and AI, with the knowledge of engineers encoded into the twins or other models. It provides partition of functionality. It preserves many types of non-linear and non-continuous representations which would be infeasible in a pure AI approach, even if the AI was made of many NNs and tree structures.

VAI enables ensembles without forced voting or averaging. Redundancy is another desirable attribute of VAI. Most random forests are ensembles, but because of the Six Limitations, they inherit the weaknesses already described. Most current AI ensembles are blended by averaging or selecting from among ensemble elements. Averaging is said to have won several hackathons with gradient boosted random forests. Ensemble blending methods include several variants, and several weighting functions, resulting in several different names. Perhaps because of the history of using deep AI for classification, these voting or averaging methods arrive at a deterministic result; either it's a cat, or not.

Because classifiers are based on the crisp linear logic of our left hemispheres, they are vulnerable to a problem/joke Pearl likes to tell his AI and Computer Science students:

Input:

1. "If the grass is wet, then it rained."

2. "If we break this bottle, the grass will get wet."

Output: "If we break this bottle, then it rained" Neurological studies show that right hemisphere damage makes humans prone to say the same kind of silly things as Pearl's hypothetical AI. The right hemisphere can deal with multiple alternatives and ambiguity better than the left. The left hemisphere masters the familiar and would posit Pearl's first statement. The right knows the second one is silly. Together they are more powerful than either on its own. This is part of the reason normal humans "get" the humor of Groucho Marx.

Humans are comfortable with ambiguity and even contradiction. This is one of the characteristics of intelligence higher than simplistic DNNs.

As described above, using VAI principles, we can construct a system with redundant systems which are highly dissimilar. We can easily create a vector of results, and a wide range of system actions or responses. To improve transparency, we can meaningfully compare the system component findings.

As described above, the exemplary VAI system can create the four separate abstractions and call each a digital twin. We don't need to sacrifice any of the insights we can glean from each of them. And, because of segmentation, we can think of them as a sparse matrix. Building out the entire matrix (even if it was possible considering the Six Limitations) would be a huge NN in a deep AI. But with a VAI system implementation, we have reasonable hope of building the system described on a limited edge computing platform. This is a very robust and dynamic form of redundancy, not easily achieved by OAs, but natural for the VAI.

Figure 6:
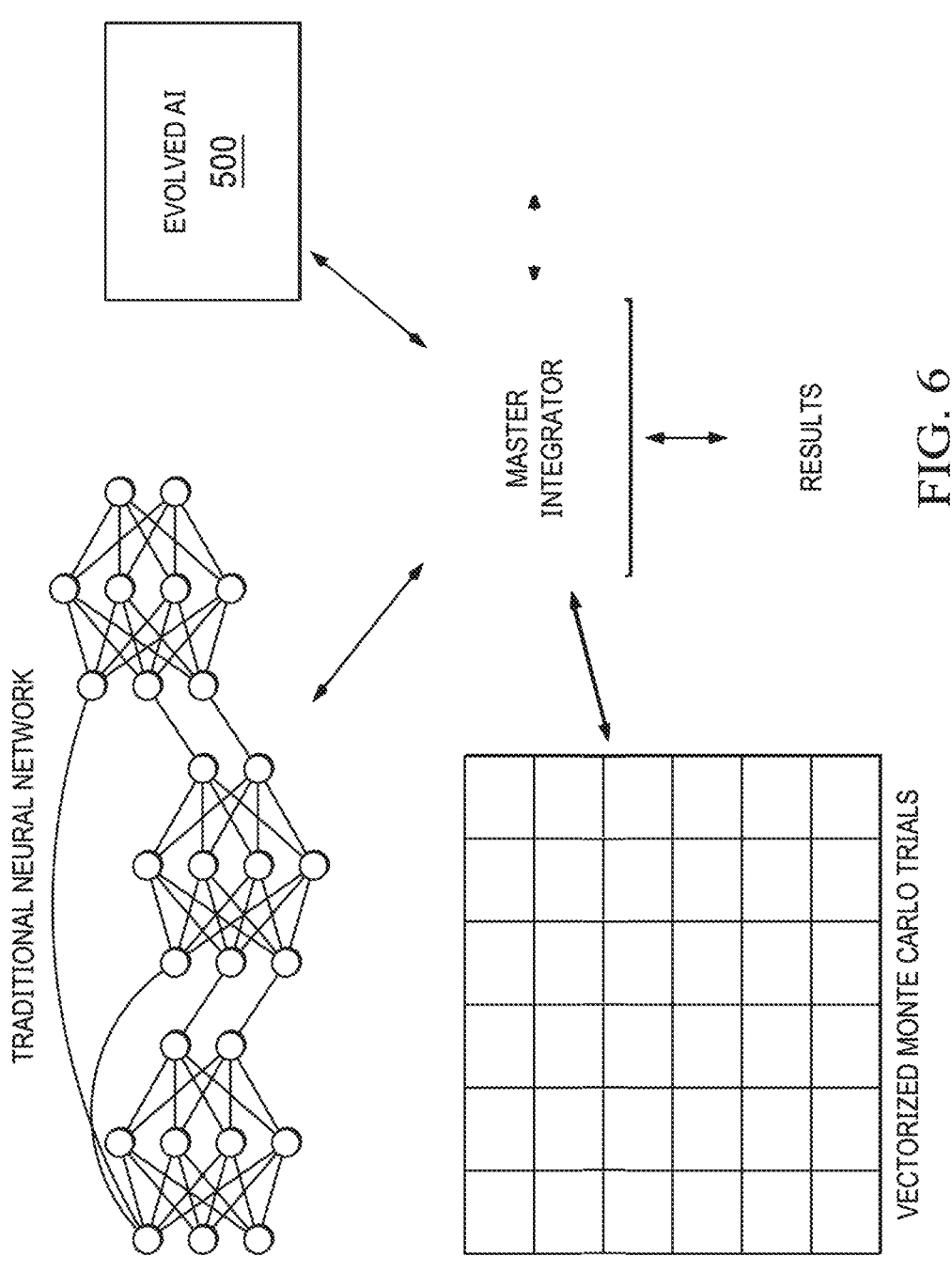
FIG. 6 illustrates a block diagram of a master integrator for blending dissimilar data and artificial intelligence.

VAI naturally accommodates the control of multiple components and abstractions by means of a Master Model Integrator (MMI). As shown in FIG. 6, MMI is a means to integrate disparate components into hybrid system, whether a VAI, or simply a hybrid simulation system. An MMI system is an integrating model system with native probabilistic processing. Lone Star's TruNavigator® and AnalyticsOS$^{SM}$ are examples of such native stochastic modeling environments.

To integrate deterministic models, the results of vectorized results, embodied in SLURPs or similar system constructs, are used in the integrating model system. When a full system of systems has been represented, optimization elements of the system are activated. As an example, a nonlinear optimizer can be operated such as used in Evolved AI 500. Other stochastic methods can be used, including stochastic gradient descent (SDG).

Because the relationships in each trial set are preserved, the optimal inputs can be determined, while at the same time integrating several different legacy systems represented in their SLURPs (or other such system construct).

The MMI can function in a number of useful ways. For oil field optimization, MMI can integrate large systems such as reservoir estimation systems, gathering system flow management and prediction systems, oil price futures economic models, artificial lift modeling systems, and others. Some of these system components are likely to represent very large sunk investments. MMI creates a viable integration system without the need to reinvest or replace successful legacy systems. For VAI, MMI provides a means to optimally integrate highly dissimilar system components, with the result being a Vigorous AI which optimally integrates system elements which might not otherwise be easily blended, much less optimized.

Preservation of uncertainty is another feature of VAI. Most current deep AI performs probabilistic feature detection of some sort. But the shape and span of uncertainty is lost, and yes/no binary results are the typical results. A critical aspect of this this loss is treatment of "truth" as a binary attribute. AI classifiers mimic the left hemisphere and attempt to determine if something is true/not. This can be thought of in terms of classical probability of detection and false alarm, the intersection of signal processing and Bayesian decision making But perhaps more importantly, it can be thought of in terms of considering contrasting and even contradictory findings.

Current deep AI successfully avoids Orwellian "doublethink." Doublethink holds contradictory and even opposing beliefs without cognitive dissonance. But it sacrifices the uncertainty around a person in a cat suit. Is that a picture of a cat? Well, yes, it is, but no it isn't. This sacrifice is at the heart of current AI's inability to tell the difference between good natured humor, sarcasm, and falsehood. It explains why current AI can't "get" Groucho Marx. With VAI there is no need for this sacrifice. The full span of uncertainty is easily preserved by stochastic methods in the mechanistic system components. Thresholds for classification, alerts and system state transitions can be adaptive. VAI also preserves competing representations of truth.

The preservation of both types of uncertainty is immensely powerful. In biological systems we see this use of uncertainty for mode shifting and threshold adaption. A prey species will shift to several different behaviors depending on the odds that a stimulus represents a predatory threat. White tailed deer will freeze under some condition, and leap away under slightly different conditions. The presence of another deer, alerting with white tail held high will shift the odds of freezing or fleeing.

In most prey species, the right hemisphere seems to be constantly looking for danger. Constantly looking for uncertain trouble is perhaps the most important form of uncertainty to be preserved for many VAI applications. In the case of GPS spoofing, or navigation failures, VAI can mimic the right hemisphere by constantly asking "is the GPS really working?" And asking, "when was the last time GPS was provably correct?"

Preservation of uncertainty has applications to both internal VAI processing, and to VAI interactions with other systems, and with humans. Military research has long focused on dealing with uncertainty, while recognizing its constant presence. Clausewitz spoke of the "fog of war" but the concept predates even Sun Tzu. A former Secretary of Defense often reminded subordinates, "the first reports are always wrong." Recent work by Professor Sibel Adali at Rensselaer Polytechnic Institute and Dr. Jin-Hee Cho of the U.S. Army Research Laboratory show preserving uncertainty, even when a great deal of doubt exists, is helpful for commanders making critical decisions.

Preservation of uncertainty, and the option to provide a representation of it, is critical in highly ambiguous circumstances. It allows making better decisions faster. Bayesian adaptation is an example of benefits of preserving uncertainty. These methods are richer than simply noting a threshold was (or was not) crossed the last time we tested. Preservation of uncertainty is also critical in high dimensional spaces, which VAI is well suited to address.

Mechanistic methods are particularly useful for VAI. If we have adequate engineering information to know that speeds above a certain RPM exhibit non-linear bearing wear, compared to a different wear profile at lower speeds, then we should not expect it to be useful to attempt to train a deep AI, whether NN or tree. The curse of dimensionality will deny us a rich data set in the non-linear failure region, and it is likely our fitting will result in an AI more linear than the runaway failure mode.

Mechanistic methods can easily deal with T4C violations, if business rules or laws of physics or other constructs define the system and its behavior. Use of mechanistic models which incorporate uncertainty provide the flexibility to address problems which might otherwise be intractable for deep AI methods. In particular, mechanistic methods deal well with non-linear, non-continuous, and non-monotonic functions. We simply don't need an AI to learn repeatedly the temperature at which electrical insulation fails. But the chemical breakdown of insulation is controlled by a highly non-linear exponential function, something difficult to train a DNN to learn with limited observations of that particular failure.

Mechanistic methods also deal with multiple types of uncertainty. It is very natural to create a mechanistic model to deal with problems like the Monty Hall problem, even though the person programming the model might be prone to misunderstand it. Good mechanistic models teach us things we didn't understand. This is a contrast to AI classifiers which often depend on the limits of human understanding.

Mechanistic algorithms, even if stochastic may be derided as "hard coded." Primates arrive with some hard coding at birth. All species know how to breathe and eat. A Whitetail fawn can walk. Mammals can nurse. Hard coding is not antithetical to intelligence. Rather, it protects and preserves the allocation of flexible and adaptive processing where learning is needed.

Brute force deep AI methods waste resources (both data and processes) by rejecting mechanistic methods. Because mechanistic models can be implemented in systems quickly and can offload those areas where deep AI is truly needed, we gain significant reductions in data collection, data cleaning, model training and other limitations of pure AI and OA approaches.

On the other hand, mechanistic methods are greatly enhanced by using the strengths of AI when uncertainty is preserved. The three previous principles (Avoiding undesirable depth by segmentation, Ensembles without forced voting or averaging (redundancy) and Preservation of uncertainty) create even more vigor when appropriate mechanistic methods are employed. It should be clear, for example, that the dimensionality reduction from segmentation is enhanced by use of mechanistic models.

Hard overrides are more feasible in VAI systems than pure deep AI systems. Because VAI segments a system into understandable components, intervention based on those components is more natural. As a result, mode changes and safeguards are more easily devised. This is due to:

improved explainability of segmented systems over massive, deep AI improved explainability of mechanistic systems over pure AI sophisticated override logic enabled by preservation of uncertainty characteristics comparison of multiple dimensions of ensemble results System mode (or state) logic and other forms of hard overrides allow VAI to exhibit highly non-linear behavior with rich adaptation. Such behavior is difficult or impossible to achieve with traditional AI or OA.

The societal risks from pure AI or OA making life altering choices are lessened by this attribute of VAI systems. For example, a mechanistic human performance model representing the experience of a parole officer could estimate the span of uncertainty around the officer's judgements and recommendations. Officers with a great deal of experience, and whose knowledge is current in the topics relevant to a case, might be deemed less prone to bias or error than a less proven officer. A VAI combining the mechanistic experience model, estimating the risks of error and bias by the officer, along with a deep AI risk model, could be supervised by hard overrides testing for statistical bias in the officer's case load or in other statistical pools. The logic could shift from alerting a supervisor to a plausible statistical bias, to an urgent warning depending on the elements of the VAI.

This approach has analogues to previous examples. To prevent the hypothetical fishing AI from draining the lake, we would summarize the applicable fishing laws. To prevent distraction from GPS or other navigation and timing controls, we would add some safety checks to the supervisor.

Non-linear mode controls are a final attribute of VAI described in this paper. In biological systems, the elements of the system are integrated into control mechanisms separate from, and in ways more richly complex than hard overrides.

A skilled pilot shifts focus to a few factors while landing an aircraft. This shift of attention varies from other flight regimes. But it also varies with the landing. Low visibility, buffeting cross winds, precipitation, and other factors will cause critical changes in behavior and focus. Even though the pilot has a checklist to guide the correct typical behavior, a skilled pilot's experience changes the allocation of effort and attention.

Figure 7:
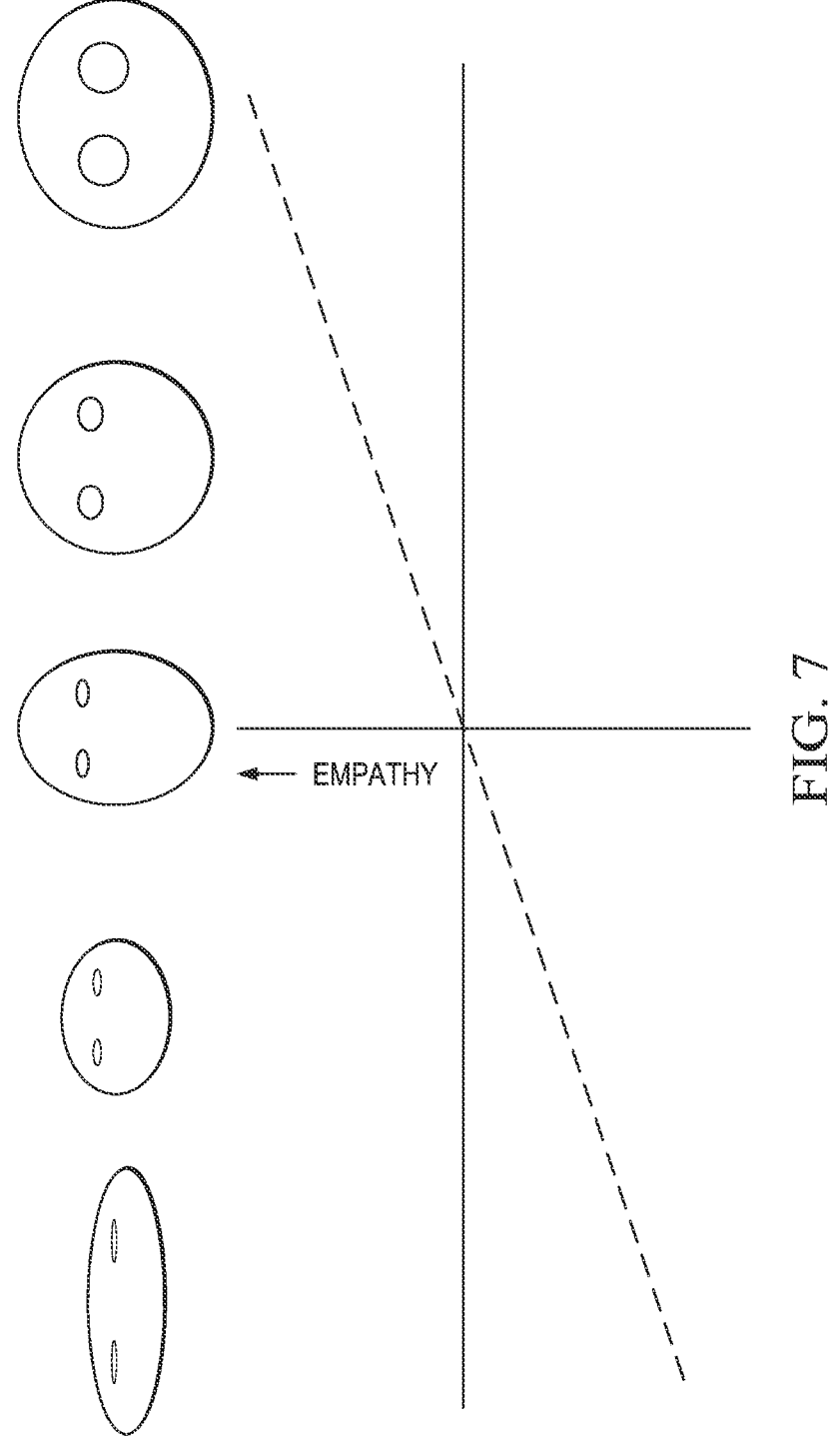
FIG. 7 illustrates a drawing of a postulated response to a face-eye configuration.

Primates have interconnected cognitive, limbic, and endocrine systems. These are richly connected in highly non-linear ways we do not fully grasp. The sense that "something is wrong" might come from some combination of right hemisphere (unspoken) processes. It could seem more urgent if sensory information (balance, noise) were unfamiliar. This combination could trigger an adrenaline response, shifting many physiological systems. This chain of events creates options, such as "fight or flight" without committing to a predetermined path. The chain starts a response with good prospects (best Bayesian prior) and modifies the path as information is added. The "fight or flight" decision might further be modulated by factors such as those shown in FIG. 7. The defense of the vulnerable (right side of FIG. 7) might change the choice to "fight" and make "flight" an unethical choice.

This is far different from brittle AI, which is like the left hemisphere of the brain. With nothing like the right hemisphere to insist on other options, it is difficult to either represent, or to preserve uncertainty for DNNs. Even tree methods will struggle when uncertainty is outside the training deck which pruned and tuned the tree.

Primate intelligence displays phenomena which some neuroscientist call "modulation." The prefrontal cortex may override the impulses of the posterior brain. One part of the left hemisphere may energize its compliment on the right side when stimulus is outside the familiar patterns the left side prefers. Modulation is roughly the same as what we mean by non-linear controls, and in primates it is particularly important when dealing with uncertainty. Thus, the preservation of uncertainty is necessary for rich non-linear controls.

VAI can integrate subsystems to form a system of systems. The subsystems control each other in highly discontinuous and non-linear ways. Because traditional deep AI has underlying linearity, this is more difficult and less reliable than a VAI made up of segmented functions, some of which are mechanistic, and can be constructed to any form we choose, not constrained by T4C. Like primate brain modulation, this form of control permits "alternating dominance" where each VAI component can take precedence (whether a hard override or not). The four VAI systems/subsystems described in the example above can alternate in their dominance, just as the brain may alternate from left to right and from posterior to prefrontal as a decision is formed.

This dynamic, non-linear control makes traditional deep AI functions far more useful and powerful than might be possible in an OA. Just as the left side the brain alone is brittle, stubborn and "greedy", a VAI approach can augment with mechanistic systems who are less prone to these problems.

To summarize, this teaching has explained six principles for VAI systems and methods:

1. Avoiding undesirable depth by segmentation—Decomposition allows faster execution, improved exploitability, permits component reuse, and makes VAI control a natural and feasible system feature.
2. Ensembles without forced voting or averaging (redundancy)—Ensemble methods are powerful because they represent rich diversity. VAI seeks to preserve these multiple system states, even when they seem contradictory.
3. Preservation of uncertainty—Uncertainty is critical in VAI because it improves control functions, and because it provides human decision makers with context for aided choices. Further, it allows rich representation of uncertainty both in probabilistic terms, and in terms of alternate, even competing results.
4. Mechanistic methods—Cause and effect-based system components are less prone to seduction by falsified data and often provide parsimony (compactness). This has the effect of directly reducing important risks of current AI methods, while preserving rich hyper-dimensionality. Because there are a small number of such models which are needed repetitively to represent modern economies, systems, processes and living, these can be reused over many VAI systems, without the need for extensive hand programming, the typical objection raised by AI cargo cultists. For example, a rich mechanistic model of electric motors, ubiquitous in modern civilization, can be generated and reused in large numbers, without resorting to training a NN on these devices. Those skilled in the art will see how many topics can be supported by such compact, and reliable models, without the need for brute force AI, and without the risks of seduction faced by such AI.
5. Hard overrides—To improve safety, legal compliance, and to enable ethical AI, hard, testable controls are part of the VAI controller.
6. Non-linear mode controls—To improve robustness and deal with rare but important events, highly non-linear controls are part of the VAI system control component resulting in robustness not achievable with current AI and ML methods.

Taken together the last two principles (hard overrides, and non-linear control) provide a means to create VAI systems which embody the other four principles.

Three examples help to illustrate system implementation.

Example 1: An MMI controller provides a means of optimal control for a VAI composed of arbitrary system components. These components might include direct hardware sensors, DNNs, mechanistic models and other components. The MMI can be set to provide optimum control and response, even to novel conditions which had not been available for training purposes.

Example 2: Using MMI methods, a DNN can be trained to respond to system components. The DNN's responses can be classified as correct and incorrect for training purposes.

Example 3: A hybrid controller composed of hard coded rule, a DNN and an MMI can provide a segmented controller, to oversee the segmented system components.

Figure 8:
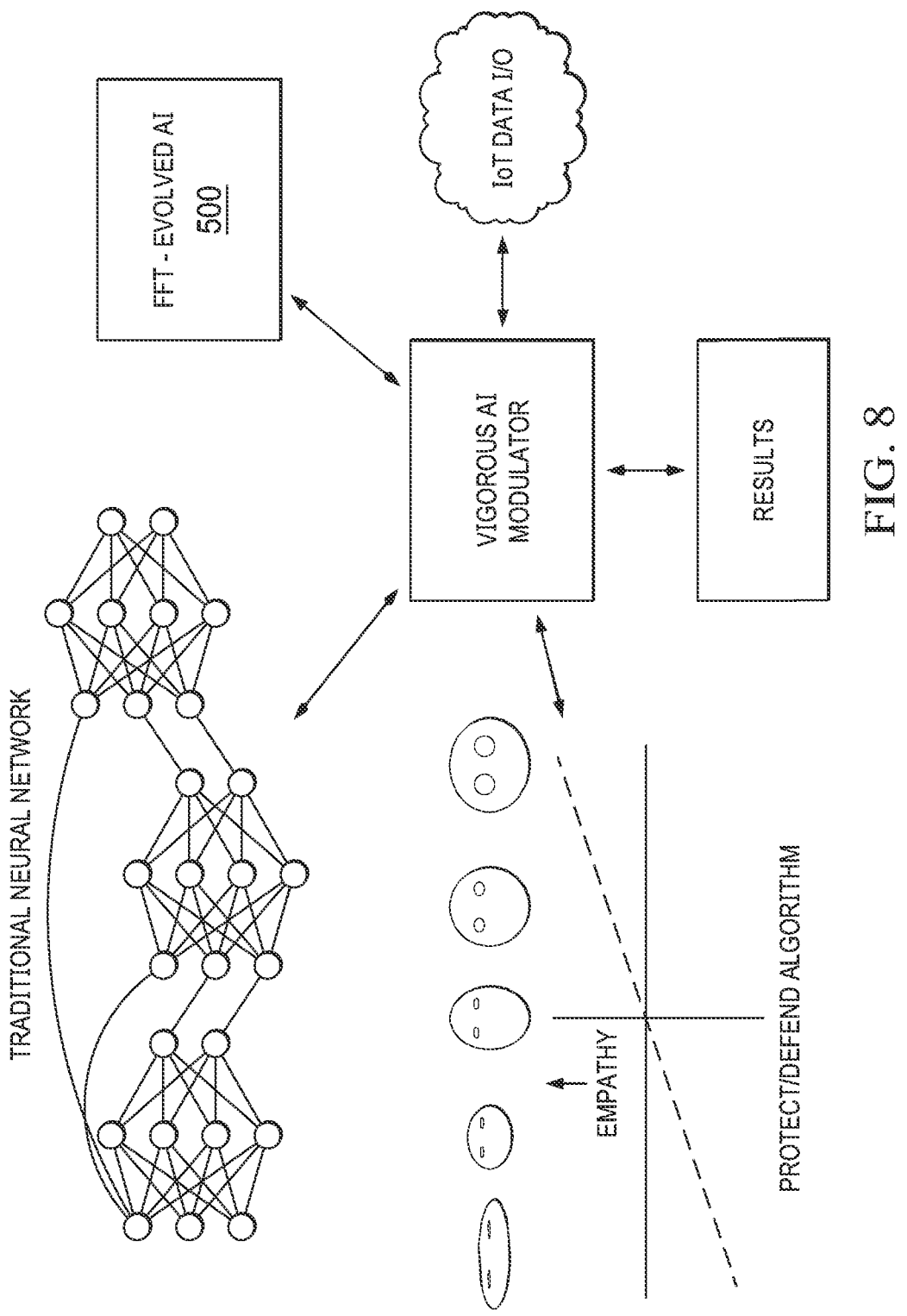
FIG. 8 illustrates a drawing of an exemplary vigorous artificial intelligence diagram.

Turning now to FIG. 8, a simplified example of VAI is presented, in accordance with an embodiment, wherein:

A traditional NN (upper left) has been trained with data.
An unconstrained NN includes FFT functionality (upper right 500).
An algorithm mimics the human tendency to protect or defend based on face and eye characteristics (lower left).
The VAI Modulator amplifies or inhibits the flow of data (from IoT, lower right) and modulates the weight given to results generated by the VAI components in order to generate results (lower center).

The traditional NN has all the benefits associated with that technology. It does not depend on known cause-effect relationships. The unconstrained NN with FFT functionality has all the benefits associated with that technology, it is unconstrained by the limitations of UAT. It responds to signals matching FFT, only. VAI modulator can choose to ignore input data, such as high frequency sounds from predator faced entities, or give weight to high frequency sounds from vulnerably faced entities. Thus, the FFT results will be preempted in one instance and amplified in another.

Figure 4:
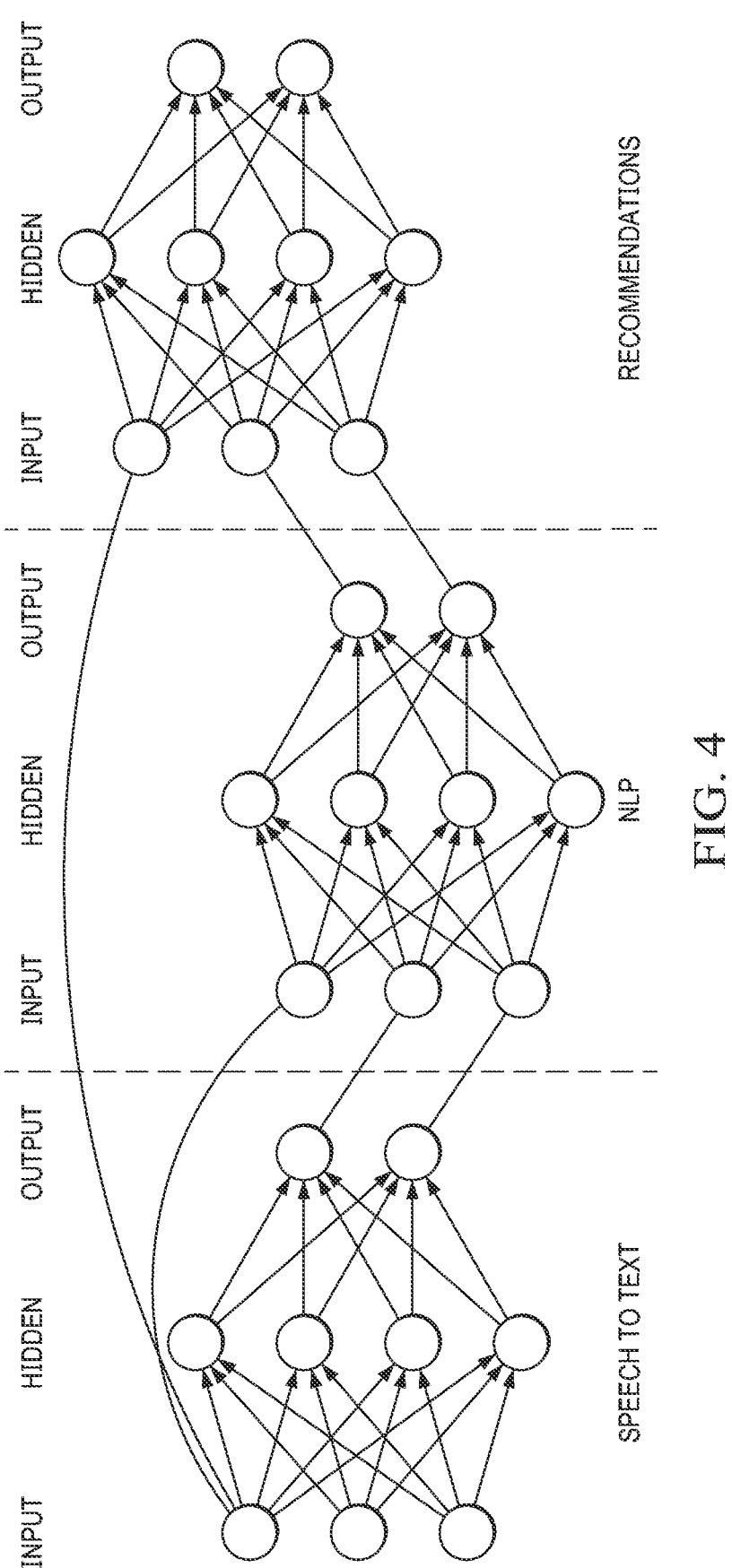
FIG. 4 illustrates a drawing of a partitioned system made of an obvious amalgam.

No traditional AI could match the performance of the exemplary system shown in FIG. 8. Training a traditional NN to perform the functions of an FFT would requires massive data sets and is vulnerable to noise, among other types of fragility. The VAI modulator is different than the obvious amalgam methods used in traditional AI. Rather than simply passing information from one stage to the next as shown in FIG. 4, the interaction and data flows are modulated. Both amplification and attenuation are performed. Timing and sequencing are implicit to the VAI modulator, which like the corpus callosum actively controls information flow to influence the outcome of the intelligence.

Figure 9:
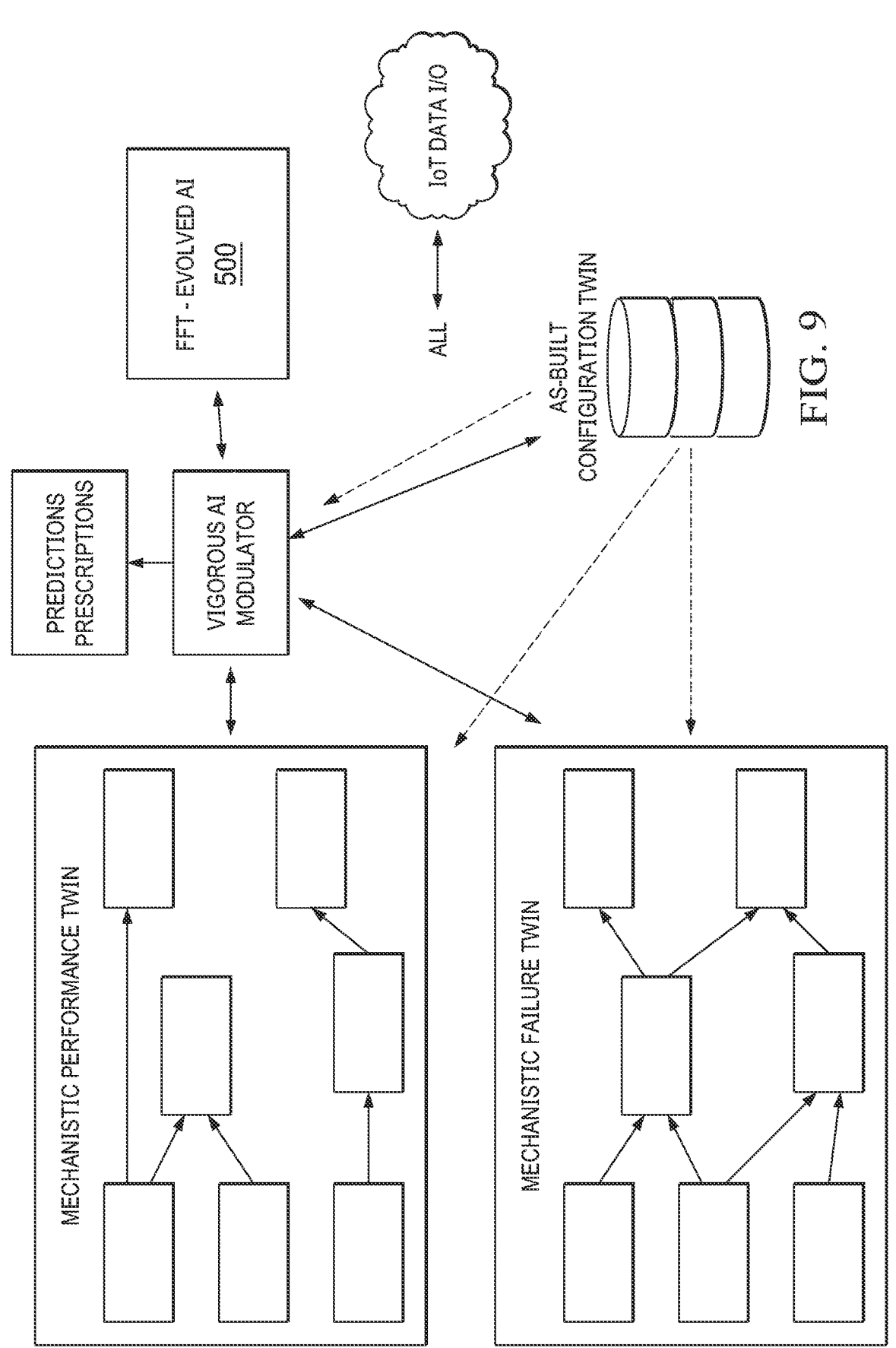
FIG. 9 illustrates an exemplary vigorous artificial intelligence diagram showing a plurality of twins.

Turning now to FIG. 9, four types of digital twins are represented; a plurality of twins, accordance with an embodiment. Each of the four have different attributes, or a plurality of twins, as described in U.S. patent application Ser. No. 16/270,338, by Roemerman, entitled "System and Method That Characterizes an Object Employing Virtual Representations Thereof," which is incorporated herein by reference. The as-built twin represents configuration, and changes in configuration over time. The performance twin is a representation of how the item should be expected to perform. If live performance varies, this might suggest intervention is needed. The failure twin predicts failure and remaining useful life. It may also prescribe specific interventions. The FFT Evolved AI Twin can mimic frequency domain attributes, in contrast to the time domain representations of the other three twins. It will be apparent to those skilled in the art that other twins might be included in this example, such as deep neural network trained twins. NN twins could provide alternative versions of both the performance twin and the mechanistic twin. An example of NN performance twins can be seen in U.S. Pat. No. 10,430,531 by Haye, entitled "Model-based System Monitoring," which is incorporated herein by reference. Thus, the plurality shown here could easily have many more elements, as will be apparent to those skilled in the art.

The Vigorous AI Modulator (center) moderates the information exchange between items and provides oversight of the system, as a whole. It determines which predictions and prescriptions are published to the system users (top center).

Internet of Things (IoT) and other input/output data flow is shown on the far right. This represents data flow available to the system, including data which the system observes but does not control. This data interacts with all the other elements shown in FIG. 9, but interconnections are omitted for the sake of clarity. Not all data need be controlled by the VAI Modulator. Some direct information flow may be permitted.

The as-built twin (lower right) is a data base of the configuration of each item to be twinned. It is used to configure the other three twins, indicated by the three thin dashed lines. For example, if the item to be twinned can be configured with different types of electric motors, the as-built twin data will reflect motor characteristics such as line voltage, single or multiple phase, whether the motor has variable frequency drive control, target RPM, maximum allowable temperature, or any of several other attributes which will be apparent to those skilled in the art.

The performance twin (upper left) predicts how the item should perform in the real world. If a plurality of performance twins were employed each of those twins would provide such predictions. While FIG. 9 shows a mechanistic twin, an NN twin could be employed instead of, or in addition to the mechanistic twin. Differences between observer performance and predicted performance is a key attributed use by the VIA Modulator. If a plurality of performance twins were employed the differences between these twins, and their differences compared to the real world would further be used by the VAI Modulator.

The FFT Evolved AI Twin (upper right 500) provides a frequency domain representation of the item.

The Vigorous AI Modulator provides control functions and oversight. For example, if the as-built twin shows a change in configuration, but IoT data I/O shows the system has not been taken off line, the configuration change might be challenged, or the configuration update delayed, pending down time and validation the configuration has been updated. Thus, the VAI can accommodate the contradiction of a supposed configuration update which is not consistent with other abstractions in the plurality of twins.

Meanwhile the contraction can be used to create anticipation. If the configuration twin shows component recalls have been issued, while the failure twin is prediction imminent end-of-life for the same component, it might issue a prescription to prioritize intervention, and further alert maintainers that while the configuration twin shows a change has been made, the actual update seems to have not yet been accomplished. The VAI is anticipating the need for more urgent attention. This is just one example, and other similar benefits from the VAI will be understood by those skilled in the art.

As previously mentioned, not all information flow need be under the control of the VAI Modulator. In human neural processes, reflexes exhibit a variety of reflexes, as do other higher forms of life which are sometimes classified as hereditary, instinctive, or otherwise innate. These do not normally operate under the higher forms of cognitive processing.

Avoiding using the VAI Modulator as a choke point provides faster reactions for some critical functions and avoids processing burden for mundane tasks. Higher forms of life do not require use of higher cognitive functions for simple acts as chewing, swallowing, blinking, stepping, or standing (depending on the species). Those skilled in the art will see this is a significant system architectural advantage compared to brute force AI, with large scale NNs. This is an example of how VAI directly addresses the curse of dimensionality, and other AI processing challenges.

FIG. 9 helps to illustrate how a VAI can mimic the systems architecture of higher forms of intelligent life by partitioning, modulation, and prioritization. Future it helps illustrate that multiple forms of processing from NNs to Evolved AI to mechanistic models can be blended to create hybrid vigor, with attributes superior to any of the individual constituents. Those skilled in the art will appreciate this is exemplary, and many other configurations will be obvious.

Figure 10:
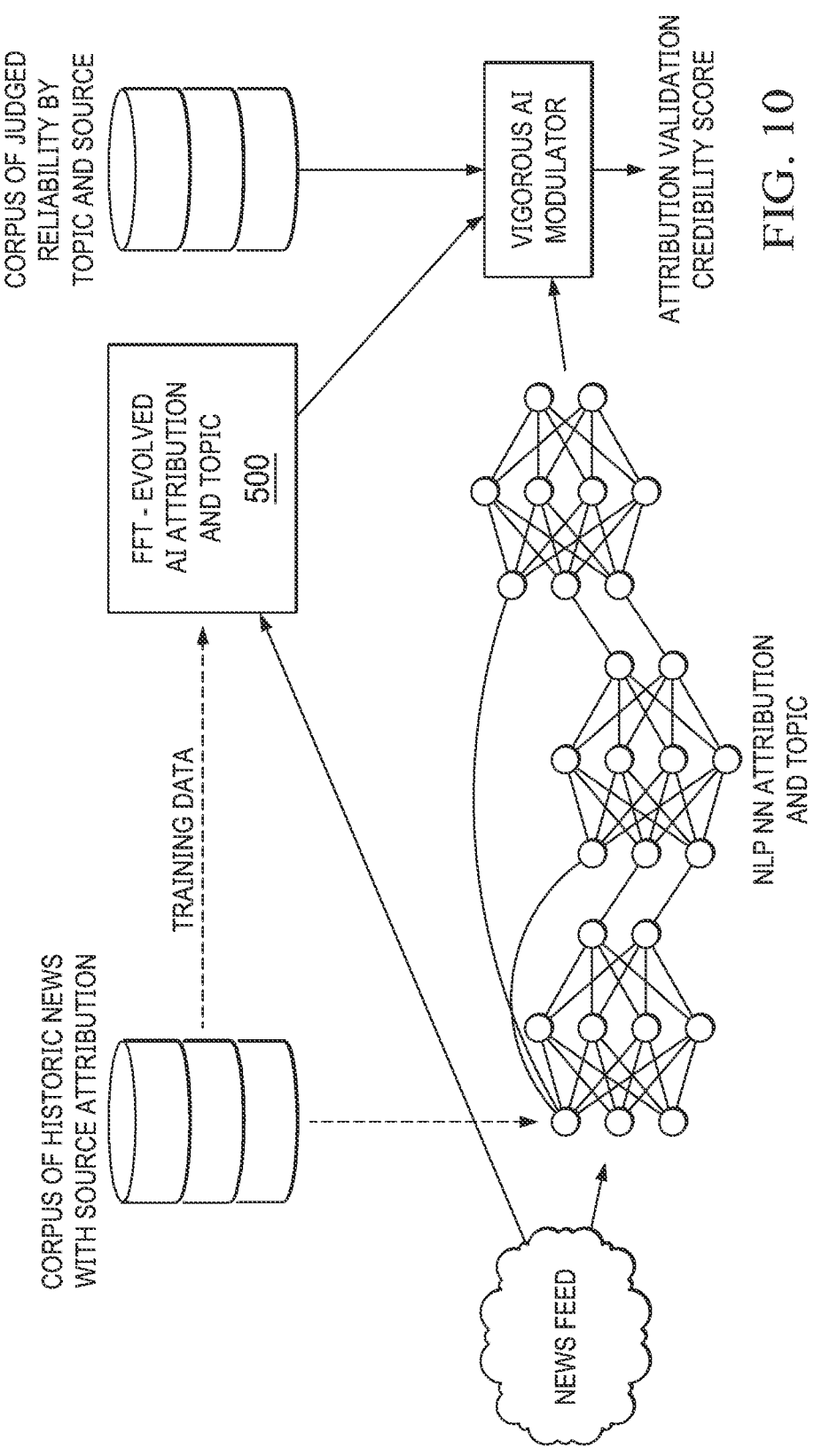
FIG. 10 illustrates a drawing of vigorous artificial intelligence news story attribution and a credibility system.

Turning now to FIG. 10, an exemplary system to validate the attribution of news information, and to assign a credibility score is presented, in accordance with an embodiment. This exemplary system illustrates how VAI can blend uncertainty, ambiguity, and multiple types of AI to produce a responsive and trustworthy assessment of live news feeds from the internet.

In the upper left, a corpus of historic "news" has been complied. This would include stories from mainly "straight news" such as United Press International, the Wall Street Journal, etc. In addition, "slanted news" sources such as state-controlled press such as RT Press (Russian press), "advocate press" such as National Review, Mother Jones, etc., and "satire press" such as The Onion and Babylon Bee are included.

The corpus of historic news and attribution are used to train two AI systems which classify each story in two dimensions; attribution and topic. The AI systems are an FFT based Evolved AI (upper center 500), and a Natural Language Processing Deep Neural Network (lower center). These two systems provide a redundant input to the VAI Modulator (lower right), when live News Feed information (lower left) is presented to the AI.

A corpus of judged relatability by topic and source (upper right) also feeds the VIA Modulator. A panel of human experts is tasked to assess the reliability of news sources on a variety of topics, matching the topic classifications used to train the two AIs. A given judge might assign high credibility on sports to Sports Illustrated but less credibility to RT Press and zero credibility to The Onion. Publications by advocacy groups and industry associations provide further classes of news sources to be judged, which represent both a degree of expertise, and a degree of bias.

The panel of judges' inputs provides a spread of uncertainty representing source relatability (a statistical distribution). This distribution reflects both the span of credibility of the source, and the perception of credibility across the population of judges. The judges can be selected to ensure diversity of expert knowledge, political persuasion, religious belief, gender balance, cultural perspectives, and ethic viewpoint. Thus, the risk of unethical bias can be greatly reduced. At the same time, using this diverse group to create a distribution of judgements preserves contradictory viewpoints and honest disagreement.

The corpus of judged reliability drives a rule-based system, similar to the expert systems of early AI, within the VAI Modulator. The Modulator compares the topic and attribution results from the two AIs to create a composite topic and attribution result. If the two AIs disagree on topic or on attribution, this indicates a risk in the system's ability to confidently classify a news story. Agreement indicates less risk in classification. Classification results (topic and attribution) are compared with the attribution in the news feed. If byline attribution fails to match with the AI classifier attribution, this also indicates risk in the attribution.

The rule-based system avoids human biases such as confirmation bias. A story which confirms the prejudices of a human reader are unlikely to mislead the system presented in FIG. 9. Further, the rules represented in the VAI modulator can be crafted to ensure ethical responses. Ambiguity will be treated consistently, regardless of the topic, for example.

It will be clear to those skilled in the art that the system presented in FIG. 9 can provide explainable, fast assessments of news stories with reduced risk of bias, prejudice and unethical behavior. Further it will be clear to those skilled in the art that this system resists deception and false attribution and can provide an assessment of confidence in the source and the content of a story, which would otherwise be impractical.

The exemplary systems shown in FIGS. 8, 9, and 10 serve to illustrate how the Vigorous AI system architecture disclosed herein can be adapted to a wide range of applications. Like older AI methods, VIA has broad fields of use, ranging from natural language processing, to machine control, maintenance planning and many others.

Turning now to FIG. 11, illustrated is a flow diagram of an embodiment of a method 1100 of evaluating an object to predict a characteristic of the object. The method 1100 may be employable in an artificial intelligence system to predict the characteristic of the object. The method 1100 is operable on a processor such as a microprocessor coupled to a memory. The method 1100 begins at a start step or module 1105.

At a step or module 1110, a first model is trained using a corpus of data.

At a step or module 1120, an object is evaluated using the first model to produce a first prediction of a characteristic of the object.

In an embodiment, the evaluating the object using the first model includes producing a quality of the first prediction. In an embodiment, the quality of the first prediction includes a confidence thereof.

At a step or module 1130, the object is evaluated using a second model to produce a second prediction of the characteristic of the object, the second model being dissimilar to the first model.

At a step or module 1140, a final prediction of the characteristic of the object is generated as a function of dynamic weightings of the first prediction and the second prediction.

In an embodiment, the dynamic weightings are a function of at least one external input. In an embodiment, the dynamic weightings are a function of predefined rules. In an embodiment, the dynamic weightings are constructed to ensure explainability.

The method 1100 terminates at end step or module 1150.

The first model can be, as an example, a Fast Fourier Transform trained on a stochastic network. Another example model can be a failure model, a mechanistic cause and effect model such as a Kalman filter, or an as-built model representing constituent parts that make up a system. The second model, being dissimilar to the first, can be, as a further example, a digital failure twin of the first model. Knowledge of an engineer can be encoded into one or more of digital twins or into the other model. A traditional neural network trained with data can be functional for the first model, such as training by a newsfeed.

The predicted characteristic of the system can include, as examples, an estimation of a natural resource reservoir capacity, a binary quality that may be true or not, or a quality of human judgment. A confidence of the predicted characteristic can be produced. A mechanistic cause and effect model can incorporate uncertainties.

Turning now to FIG. 12, illustrated is a block diagram of an embodiment of an apparatus 1200 for predicting a characteristic of an object. The apparatus 1200 is configured to perform functions described hereinabove of predicting the characteristic of the object. The apparatus 1200 includes a processor (or processing circuitry) 1210, a memory 1220 and a communication interface 1230 such as a graphical user interface.

The functionality of the apparatus 1200 may be provided by the processor 1210 executing instructions stored on a computer-readable medium, such as the memory 1220 shown in FIG. 12. Alternative embodiments of the apparatus 1200 may include additional components (such as the interfaces, devices and circuits) beyond those shown in FIG. 12 that may be responsible for providing certain aspects of the device's functionality, including any of the functionality to support the solution described herein.

The processor 1210 (or processors), which may be implemented with one or a plurality of processing devices, perform functions associated with its operation including, without limitation, performing the prediction of the characteristic of the object. The processor 1210 may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The processor 1210 may include, without limitation, application processing circuitry. In some embodiments, the application processing circuitry may be on separate chipsets. In alternative embodiments, part or all of the application processing circuitry may be combined into one chipset, and other application circuitry may be on a separate chipset. In still alternative embodiments, part or all of the application processing circuitry may be on the same chipset, and other application processing circuitry may be on a separate chipset. In yet other alternative embodiments, part or all of the application processing circuitry may be combined in the same chipset.

The memory 1220 (or memories) may be one or more memories and of any type suitable to the local application environment, and may be implemented using any suitable volatile or nonvolatile data storage technology such as a semiconductor-based memory device, a magnetic memory device and system, an optical memory device and system, fixed memory and removable memory. The programs stored in the memory 1220 may include program instructions or computer program code that, when executed by an associated processor, enable the respective apparatus 1200 to perform its intended tasks. Of course, the memory 1220 may form a data buffer for data transmitted to and from the same. Exemplary embodiments of the system, subsystems, and modules as described herein may be implemented, at least in part, by computer software executable by the processor 1210, or by hardware, or by combinations thereof.

The communication interface 1230 modulates information for transmission by the respective apparatus 1200 to another apparatus. The respective communication interface 1230 is also configured to receive information from another processor for further processing. The communication interface 1230 can support duplex operation for the respective other processor 1200.

The Vigorous AI approach introduced herein solves several important problems:

VAI can be controlled to ensure ethical behavior;

VAI can be tested to prevent unethical behavior;

VAI provides explainable, transparent system function;

VAI can greatly reduce the curse of dimensionally;

VAI can perform at higher levels of confidence with less training and input data;

VAI can incorporate multiple abstractions of reality and tolerate ambiguity; and, VIA can incorporate multiple abstractions of realty and accommodate contradictions.

A partitioned approach has been introduced for Artificial Intelligence to provide vigor such as for predicting a characteristic of an object. The systems and methods described herein use principles from higher order human intelligence. These include functional partitioning to constrain AI functions to limited or segmented roles, allowing the functions to operate with a degree of independence (including allowing for disagreement) and further includes functional combinations which include integration, inhibition, and excitation. The VAI approach can be used to create a system and method which: more reliably converges compared to existing art; can resist a wide range of subtle errors including human foibles; is easier to explain compared to existing art; allows representations of highly non-linear and non-continuous functions; copes with dimensionality, requiring less data than existing art, and is less likely to require dimensionality reduction; accommodates uncertainty and even contradictions; and, naturally resists data-driven contamination, both accidental and malicious.

As described hereinabove, the exemplary embodiments provide both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a processor. In particular, in the case of firmware or software, the exemplary embodiments can be provided as a computer program product including a computer readable storage medium embodying computer program code (i.e., software or firmware) thereon for execution by the computer processor. The computer readable storage medium may be non-transitory (e.g., magnetic disks; optical disks; read only memory; flash memory devices; phase-change memory) or transitory (e.g., electrical, optical, acoustical or other forms of propagated signals-such as carrier waves, infrared signals, digital signals, etc.). The coupling of a processor and other components is typically through one or more busses or bridges (also termed bus controllers). The storage device and signals carrying digital traffic respectively represent one or more non-transitory or transitory computer readable storage medium. Thus, the storage device of a given electronic device typically stores code and/or data for execution on the set of one or more processors of that electronic device such as a controller.

Although the embodiments and its advantages have been described in detail, it should be understood that various changes, substitutions, and alterations can be made herein without departing from the spirit and scope thereof as defined by the appended claims. For example, many of the features and functions discussed above can be implemented in software, hardware, or firmware, or a combination thereof. Also, many of the features, functions, and steps of operating the same may be reordered, omitted, added, etc., and still fall within the broad scope of the various embodiments.

Moreover, the scope of the various embodiments is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized as well. Accordingly, the appended claims are intended to include within their scope such processes, machines, manufacture, compositions of matter, means, methods, or steps.

The invention claimed is:

1. A method in an operations and maintenance (O&M) system for controlling an operation of a second system, wherein said second system comprises a plurality of objects, comprising:

evaluating at least one of said plurality of objects at a first time using a first model to produce a first prediction of a characteristic of said at least one of said plurality of objects;

evaluating said at least one of said plurality of objects at said first time using a second model to produce a second prediction of said characteristic of said at least one of said plurality of objects, said second model being dissimilar to said first model;

generating a final prediction of said characteristic of said at least one of said plurality of objects as a function of dynamic weightings of said first prediction and said second prediction; and executing an operational or maintenance decision with respect to said second system as a function of said final prediction of said characteristic of said at least one of said plurality of objects to avoid a failure of said at least one of said plurality of objects.

2. The method recited in claim 1, wherein said executing said operational or maintenance decision comprises at least one of:

modifying said operation for said at least one of said plurality of objects comprising said second system; and scheduling a maintenance action for said at least one of said plurality of objects comprising said second system.

3. The method recited in claim 1, further comprising receiving, by said O&M system, data from one or more sensors associated with each of said plurality of objects.

4. The method recited in claim 3, wherein said evaluating said at least one of a plurality of objects using said first model and said second model comprises utilizing said data from said one or more sensors as an input to said first model and second model.

5. The method recited in claim 1, further comprising determining a quality of said first prediction and said second prediction.

6. The method recited in claim 5, wherein said quality comprises a measure of confidence in said first prediction and said second prediction.

7. The method recited in claim 5, wherein said dynamic weightings are a function of said quality.

8. The method recited in claim 1, wherein said dynamic weightings are a function of at least one external input.

9. The method recited in claim 1, wherein said dynamic weightings are a function of at least one predefined rule.

10. The method recited in claim 1, wherein said first model is a digital twin of said second model.

11. The method recited in claim 1, wherein said first model comprises a neural network.

12. The method recited in claim 1, further comprising training said first model using a corpus of known data.

13. The method recited in claim 1, wherein one of said first model and second model comprises a Fast Fourier Transform.

14. An operations and maintenance (O&M) system for controlling an operation of a second system, wherein said second system comprises a plurality of objects, said O&M system being operable on a processor and memory, configured to:

evaluate at least one of said plurality of said objects at a first time using a first model to produce a first prediction of a characteristic of said at least one of said plurality of objects;

evaluate said at least one of said plurality of objects at said first time using a second model to produce a second prediction of said characteristic of said at least one of said plurality of objects, said second model being dissimilar to said first model;

generate a final prediction of said characteristic of said at least one of said plurality of objects as a function of dynamic weightings of said first prediction and said second prediction; and execute an operational or maintenance decision with respect to said second system as a function of said final prediction of said characteristic of said at least one of said plurality of objects to avoid a failure of said at least one of said plurality of objects.

15. The O&M system recited in claim 14, wherein said processor and memory are configured to execute said operational or maintenance decision comprising at least one of:

modify said operation for said at least one of said plurality of objects comprising said second system; and schedule a maintenance action for said at least one of said plurality of objects comprising said second system.

16. The O&M system recited in claim 14 wherein said processor and memory are further configured to receive data from one or more sensors associated with each of said plurality of objects.

17. The O&M system recited in claim 16, wherein said processor and memory are configured to evaluate said at least one of a plurality of objects using said first model and said second model by utilizing said data from said one or more sensors as an input to said first model and second model.

18. The O&M system recited in claim 14, wherein said processor and memory are further configured to determine a quality of said first prediction and said second prediction.

19. The O&M system recited in claim 18, wherein said quality comprises a measure of confidence in said first prediction and said second prediction.

20. The O&M system recited in claim 18, wherein said dynamic weightings are a function of said quality.

21. The O&M system recited in claim 14, wherein said dynamic weightings are a function of at least one external input.

22. The O&M system recited in claim 14, wherein said dynamic weightings are a function of at least one predefined rule.

23. The O&M system recited in claim 14, wherein said first model is a digital twin of second model.

24. The O&M system recited in claim 14, wherein said first model comprises a neural network.

25. The O&M system recited in claim 14, wherein said processor and memory are further configured to train said first model using a corpus of known data.

26. The O&M system recited in claim 14, wherein one of said first model and second model comprises a Fast Fourier Transform.

\*  \*  \*  \*  \*